US010412666B2

(12) United States Patent
Hedberg et al.

(10) Patent No.: US 10,412,666 B2
(45) Date of Patent: Sep. 10, 2019

(54) UE ACCESSIBILITY INDICATION FOR WI-FI INTEGRATION IN RAN

(71) Applicant: Telefonaktiebolaget L M Ericsson (publ), Stockholm (SE)

(72) Inventors: Tomas Hedberg, Stockholm (SE); Jari Vikberg, Järna (SE); Oscar Zee, Stockholm (SE)

(73) Assignee: Telefonaktiebolabet LM Ericsson (publ), Stockholm (SE)

( * ) Notice: Subject to any disclaimer, the term of this patent is extended or adjusted under 35 U.S.C. 154(b) by 637 days.

(21) Appl. No.: 14/652,949

(22) PCT Filed: Dec. 19, 2012

(86) PCT No.: PCT/EP2012/076238
§ 371 (c)(1),
(2) Date: Jun. 17, 2015

(87) PCT Pub. No.: WO2014/094849
PCT Pub. Date: Jun. 26, 2014

(65) Prior Publication Data
US 2015/0341845 A1 Nov. 26, 2015

(51) Int. Cl.
*H04W 4/00* (2018.01)
*H04W 48/14* (2009.01)
(Continued)

(52) U.S. Cl.
CPC .......... *H04W 48/14* (2013.01); *G06F 21/305* (2013.01); *G06F 21/45* (2013.01); *H04W 12/06* (2013.01);
(Continued)

(58) Field of Classification Search
None
See application file for complete search history.

(56) References Cited

U.S. PATENT DOCUMENTS 9,756,675 B2 * 9/2017 Lee ........................ H04W 76/18
2004/0268122 A1 12/2004 Satarasinghe et al.
(Continued)

FOREIGN PATENT DOCUMENTS

CN 1507291 A 6/2004
CN 102257853 A 11/2011

*Primary Examiner* — Phirin Sam
(74) *Attorney, Agent, or Firm* — Murphy, Bilak & Homiller, PLLC

(57) ABSTRACT

A network entity receives a WLAN access message from a UE. The WLAN access message includes an indication of the UE status with the telecommunication network. The network entity detects the indication of UE status and determines from the indication whether to allow the UE access to the WLAN. When the WLAN is integrated with the telecommunications network, the network entity sends a query to the telecommunication network (e.g. the RAN or core network part) for a decision based on the UE status with the telecommunication network. The indication may include data representative of RAN or core network accessibility information (e.g., limited service or no coverage), WLAN access only, a user preference for accessing the WLAN instead of the telecommunication network, and/or any other connectivity or preference information for use by the WLAN or network entity in determining whether to allow UE to access WLAN.

39 Claims, 13 Drawing Sheets

(51) Int. Cl.
*H04W 12/06* (2009.01)
*H04W 12/08* (2009.01)
*H04W 36/22* (2009.01)
*G06F 21/30* (2013.01)
*G06F 21/45* (2013.01)
*H04W 84/04* (2009.01)
*H04W 84/12* (2009.01)
*H04W 88/06* (2009.01)

(52) U.S. Cl.
CPC ........... *H04W 12/08* (2013.01); *H04W 36/22* (2013.01); *G06F 2221/2103* (2013.01); *H04W 84/042* (2013.01); *H04W 84/12* (2013.01); *H04W 88/06* (2013.01)

(56) References Cited

U.S. PATENT DOCUMENTS

| | | |
|---|---|---|
| 2006/0133319 A1 | 6/2006 | Kant et al. |
| 2008/0031192 A1 | 2/2008 | Narashimha et al. |
| 2008/0165740 A1* | 7/2008 | Bachmann .......... H04L 63/0272 370/332 |
| 2009/0196265 A1* | 8/2009 | Mariblanca Nieves ..................... H04W 8/065 370/338 |
| 2009/0213819 A1* | 8/2009 | Kalhan ................ H04W 48/12 370/338 |
| 2010/0003980 A1 | 1/2010 | Rune et al. |
| 2010/0232409 A1* | 9/2010 | Kim ....................... H04L 63/101 370/338 |
| 2012/0100848 A1* | 4/2012 | Miklos .................. H04W 16/08 455/432.1 |
| 2013/0083783 A1* | 4/2013 | Gupta ..................... H04W 4/70 370/338 |
| 2013/0121322 A1* | 5/2013 | Salkintzis ............. H04W 76/12 370/338 |
| 2014/0036900 A1* | 2/2014 | Zhang .................... H04L 63/08 370/338 |
| 2014/0050208 A1* | 2/2014 | Annaluru .............. H04W 84/12 370/338 |
| 2014/0064068 A1* | 3/2014 | Horn ................. H04W 28/0289 370/230 |
| 2014/0086177 A1* | 3/2014 | Adjakple ............... H04W 12/08 370/329 |
| 2014/0119353 A1* | 5/2014 | McCann ............... H04W 76/12 370/338 |
| 2014/0133294 A1* | 5/2014 | Horn ................. H04W 28/0247 370/230 |
| 2014/0153543 A1* | 6/2014 | Shipley ............. H04W 36/0022 370/331 |
| 2014/0153546 A1* | 6/2014 | Kim ..................... H04W 48/18 370/332 |
| 2016/0198382 A1* | 7/2016 | Jung ..................... H04W 36/22 370/331 |

* cited by examiner

UE ACCESSIBILITY INDICATION FOR WI-FI INTEGRATION IN RAN

TECHNICAL FIELD

The present invention relates to methods and apparatus for transmitting to a wireless local area network (WLAN) an indication of user equipment (UE) status with a telecommunications network for use in determining whether to allow the UE access to the WLAN.

BACKGROUND

Mobile operators are beginning to use wireless networks such as wireless local area networks based on the IEEE standard 802.11 or Wi-Fi networks to offload traffic from radio access networks (RAN) or mobile networks such as, for example, Global System for Mobile Communications (GSM), cdma2000, Wideband Code Division Multiple Access (WCDMA) and Long Term Evolution (LTE)/LTE Advanced (e.g. 2G/3G/4G and beyond). Most of the current Wi-Fi deployments are totally separate from mobile networks, and are regarded as non-integrated. The usage of Wi-Fi is mainly driven due to the free and wide unlicensed spectrum and the increased availability of Wi-Fi technologies in UEs. In addition, the end user is more proficient at using Wi-Fi, for example, at their homes and offices.

UE as described herein may comprise or represent any device used for wireless communications. Examples of user equipment that may be used in certain embodiments of the described wireless and mobile networks are wireless devices such as mobile phones, mobile terminals, terminals, stations (e.g. in the IEEE 802.11 standard a UE may be a station (STA)), smart phones, portable computing devices such as lap tops, handheld devices, tablets, net books, computers, personal digital assistants, machine-to-machine devices such as sensors or meters (e.g. wireless devices in which there is no end user associated with the device), and other wireless communication devices that may connect to wireless and/or mobile networks.

The different business segments for Wi-Fi regarding integration possibilities can be divided into mobile operator hosted/controlled vs. 3rd party hosted/controlled Wi-Fi access points. A 3rd party is considered to be anything else other than the mobile operator, 3rd party APs are typically not totally "trusted" by the mobile operator. A 3rd party could be, for example, a Wi-Fi operator or even an end-user. In both segments there exist public/hotspot, enterprise and residential deployments.

There are various types of Wi-Fi integration to mobile networks, for simplicity, the notation of 3rd Generation Partnership Project (3GPP) networks using System Architecture Evolution (SAE)/LTE nodes are described herein by way of example only. However, it is to be appreciated that similar or like network entities or nodes may be used in any other mobile network, for example, 2G/3G/4G and beyond mobile networks such as GSM, WCDMA, Universal Mobile Telecommunications System (UMTS) Terrestrial Radio Access Network (UTRAN), Enhanced-UTRAN, LTE, and LTE-Advanced.

Wi-Fi integration towards the mobile core network (also known as cellular core network) is emerging as a good way to improve the end user experience further between the cellular and Wi-Fi accesses of each operator. These solutions consist mainly of the components: common authentication between 3GPP and Wi-Fi, and integration of Wi-Fi user plane traffic to the mobile core network. The common authentication is based on automatic SIM-based authentication in both access types. The Wi-Fi user plane integration provides the mobile operator the opportunity to provide the same services, like parental control and subscription based payment methods, for the end users when connected both via 3GPP and via Wi-Fi. Different solutions are specified in standardized in 3GPP Technical Specification 23.402, and may include overlay solutions (S2b, S2c) and integrated solutions (S2a), which are currently being further developed (S2a, S2b, S2c indicating the 3GPP interface/reference point name towards the packet data network (PDN) Gateway (PDN-GW)).

FIG. 1a illustrates a simplified network architecture for a communications system 100 including a telecommunications network 101 (also known as a mobile or cellular network), where the telecommunication network 101 (represented by the round-dotted line area) includes a RAN 102 and core network 103 parts. The core network part 103 is represented by the square-dotted line area and the RAN 102 is represented by the dashed-dot line area. The communications system 100 also includes a WLAN 104 and further IP networks 118 (e.g. the Internet or any other network). The wireless network 104 is represented by the dashed line area. The telecommunications network 101, IP networks 118 and WLAN 104 are connected together via various communication paths and are in communication with each other. In this example, the telecommunication network 101 is illustrated as being integrated with WLAN 104.

In this example, the telecommunication network 101 is an LTE based network and the RAN 102 includes an eNodeB 108 that is connected via the S1-interfaces (e.g. S1-MME and S1-U) to a Mobility Management Entity (MME) 115 and a Serving Gateway (SGW) 116, respectively, of the core network part 103. The core network part 103 also includes, among other network nodes and elements, a Home Subscriber Server 121 (HSS) and Proxy-Call Session Control function (P-CSCF, not shown). The eNodeB 108 serves or supports network cell 106 indicated by the dashed-double-dot line area. The WLAN 104 in this example is a Wi-Fi access network (AN) that is connected to the PDN-GW 117 of core network part 103 via an S2a interface and to the 3GPP Authentication, Authorization and Accounting (AAA) Server 119 via the STa interface. The WLAN 104 includes a wireless access point (AP) 112, which is a Wi-Fi AP. The wireless AP 112 is connected to a wireless access controller (AC) 113, which in this example is a Wi-Fi AC. The wireless AC 113 may connect the WLAN 104 to further IP Networks (e.g. the Internet) directly or via PDN GW 117 via core network part 103.

The network cell 106 and the WLAN 104 include a UE 110, which includes radio access technology (RAT) for communicating with the eNodeB 108, which supports or serves the UE 110. As shown, the UE 110 is in communication with the eNodeB 108 of RAN 102 and may also include suitable RAT for communicating with WLAN 104 via wireless AP 112. As the telecommunication network 101 is integrated with the WLAN 104 (e.g. via the S2a link between PDN-GW 117 and wireless AC 113), the wireless AC 113 communicates with the 3GPP AAA Server 119 for use in authorizing the UE 110 in accessing both the WLAN 104 and in accessing the telecommunication network 101 via the WLAN 104. If the telecommunication network 101 was not integrated with the WLAN (e.g. no S2a link), then the wireless AC can still communicate with the 3GPP AAA Server 119 for use in authorizing the UE 110 in accessing the WLAN 104.

Although the above describes one deployment option, it is to be appreciated by the person skilled in the art that there are multiple deployment options for integrating a mobile network with a wireless network. Some examples may include: connecting the wireless AC 113 to a Broadband Network Gateway (BNG) (not shown) to connect the wireless network 104 to the further IP networks 118 and PDN GW 117; collocating the wireless AP 112 with a Residential Gateway (RG), deploying the wireless AP 112 and wireless AC 113 without a BNG as in the example above; or even deploying the wireless AP 112 with an RG and a BNG but without an wireless AC 113. In addition, it is to be appreciated that there are multiple options for terminating/connecting the S2a interface. Some further examples include, connecting the S2a interface between a wireless AP 112/RG and PDN GW 117; between wireless AC 113 and PDN GW 117 (as shown in the FIG. 1a example); between BNG and PDN GW 117; or between a dedicated Trusted wireless local area network (WLAN) Access Gateway (TVVAG) and PDN GW 117.

FIG. 1b illustrates the possible WLAN access messages when a UE 110 initiates or connects to the WLAN 104 based on the IEEE 802.11 standard. The UE 110 associates with wireless AP 112 to obtain WLAN 104 services in which association is the process by which a UE joins the WLAN 104. The UE 110 initiates the association process, and the wireless AP 112 may choose to grant or deny access based on the contents of an association request. If UE 110 moves between basic service areas within a single extended service area, it must evaluate signal strength and perhaps switch from wireless AP 112 to another wireless AP (not shown). Authentication is a necessary prerequisite to association because only authenticated users may be authorized to use the WLAN 104.

FIG. 1c illustrates the possible WLAN access messages for UE 110 connecting to WLAN 104 via wireless AP 112 and AC 113 when Extensible Authentication Protocol (EAP) signalling is used to authenticate the UE 110 towards the WLAN 104. The UE 110 uses IMSI or some other certificate to identify itself towards the WLAN 104. Note that the IEEE 802.11 Authentication Response only opens limited ports to allow the EAP Authentication to proceed. The IEEE 802.11 Layer 2 Association Response only provides a "pending association" and full association is granted upon successful completion of EAP Authentication. When the UE 110 accesses the WLAN 104 it can be authenticated using, for example, EAP-Subscriber Identity Module (SIM)/EAP-Authentication and Key Agreement (AKA)/EAP-AKA Prime (AKA') protocols. The UE 110 can in these cases be identified by either the full authentication Network Access Identifier (NAI) or by the fast re-authentication NAI. The full authentication NAI contains the International Mobile Subscriber Identity (IMSI) of the UE 110 and the fast re-authentication NAI is similar to the temporary identities used in LTE access and are called as fast re-authentication identity or pseudonym.

As discussed above, different standards organizations have started to recognize the need for an enhanced user experience for Wi-Fi access, which is being driven by 3GPP operators. An example of this is the Wi-Fi Alliance with the Hot-Spot 2.0 (HS2.0) initiative, now officially called PassPoint. HS2.0 is primarily geared toward Wi-Fi networks. HS2.0 builds on IEEE 802.11u, and adds requirements on authentication mechanisms and auto-provisioning support. 3GPP operators are trying to introduce additional traffic steering capabilities, leveraging HS2.0 802.11u mechanisms. HS 2.0 uses the Access Network Query Protocol (ANQP) as part of the WLAN discovery and selection function. This provides a mechanism for UEs (and legacy UEs) to request different information from wireless APs to allow the UE 110 to decide whether to connect to wireless AP 112, i.e. before association with wireless AP 112.

FIG. 1d illustrates a UE 110 using a Generic Advertisement Services (GAS) protocol for carrying ANQP requests during an initiation/connection to WLAN 104. The ANQP request is included in a GAS message (a GAS query frame), and allows UE 110 to query the wireless AP 112 for configuration and reachability information before association. The UE 110 transmits the ANQP query in the GAS message. For example, in FIG. 1d, the UE 110 transmits includes in the GAS request message the ANQP request, "ANQP (3GPP Cellular Network Information)", which is a request for 3GPP Cellular Information from the WLAN 104. The wireless AP 112 may respond with a GAS response message (e.g. a GAS response frame). The ANQP-provided lists of service providers and capabilities may become extensive, the information retrieved from the GAS server (not shown) can be used by the UE 110 to decide whether it wants to connect to the wireless AP 112. The ANQP query in the GAS request can return information associated with Venue Name information, Network Authentication Type information, Roaming Consortium list, IP Address Type Availability Information, NAI Realm list, 3GPP Cellular Network information, Domain Name list, Hotspot Operator Friendly Name, Operating Class, Hotspot WAN Metrics, Hotspot Connection Capability, NAI Home Realm.

However, the above methods for UEs and legacy UEs connecting to a wireless AP 112 take action to reject/accept the access attempt only at or during the UE's Wi-Fi access/association attempt, and typically after authentication. The actions can be either to reject or accept the access attempt. In the case of access rejection, the primary issue is when to reject the UE 110 and minimize the delay in the UE 110 access attempt. Typically, it is preferable to reject the access attempt of the UE 110 early in the WLAN 104 initiation/connection process, i.e. during the initial creation of the 802.11 layer 2 association (e.g. prior to EAP authentication). However, the UE's permanent identifier (IMSI) is normally not available at this stage as the Wi-Fi MAC address of the UE is used. This applies for both full authentication and fast re-authentication (EAP-SIM/AKA/AKA'). Alternatively, rejecting the access attempt later in the process, for example after the EAP-SIM/AKA/AKA' authentication, when the UE's IMSI is known and authenticated on the network side is possible, but UE behavior is not defined in the cases when an access attempt is rejected e.g. during or after EAP-SIM/AKA/AKA' authentication, or even during DHCP procedure. Further issues arise, when the UE 110 lacks access to a telecommunications network 101 during the WLAN 104 access attempt, for example, the end user has shut down or disabled data access via the telecommunications network 101 (e.g. 3GPP), or the UE 110 is outside the telecommunications network 101 coverage. However, there is no way for the WLAN 104 to determine the preferences of the user/UE or even reduced capabilities (e.g. lack of data access) at the UE 110 and depending on load, may reject the access attempt of the UE 110, when other end users could instead be rejected due to their preference or capability to access a telecommunication network 101 for data services.

Therefore, there is a significant need to provide a mechanism for efficiently providing the WLAN 104 with UE information for use in rapidly determining whether to grant a UE access to the WLAN.

SUMMARY

It has been recognised here that whilst there are certain mechanisms for providing a UE with network information for use in determining whether to access a WLAN, none of the relevant systems can take into account the capabilities or preferences of the UE for use in efficiently determining whether to allow the UE access to the WLAN. The present invention provides the advantages of using the existing access mechanisms/messages/signals to take into account changes in the UE status with telecommunications network to more accurately determine which UE most needs to access the WLAN. Currently, there is no way for the WLAN to determine, or the UE to inform the WLAN, about the status of the UE in a telecommunication network such as available services or preferences for determining how the UE should move between the telecommunication network and WLAN based on knowledge about the different types of access available to the UE.

According to a first aspect of the invention, there is provided a method for operating a network entity in a communication system, the communication system including a WLAN and a telecommunication network comprising a RAN and a core network part.

The method includes receiving a WLAN access message from a UE. The WLAN access message includes an indication of the UE status with the telecommunications network. From the indication the network entity determines whether to allow the UE access to the WLAN.

As an option, the method includes detecting the indication of UE status within the WLAN access message. Optionally, the indication includes data representative of the UE status with the RAN and includes RAN accessibility information. As another option, the indication includes data representative of whether WLAN only access is active in the UE, and the step of determining includes allowing the UE access to the WLAN when the indication of UE status indicates WLAN only access is active. As a further option, the indication of UE status includes data representative of whether RAN access with no coverage is active, and the step of determining includes allowing the UE access to the WLAN when the indication of UE status indicates RAN access with no coverage is active.

Optionally, the indication of UE status includes data representative of whether RAN access with limited service is active, and the step of determining includes allowing the UE access to the WLAN when the indication of UE status indicates RAN access with limited service is active. As a further option, the indication of UE status further includes data representative of the user preference for the WLAN access attempt, where the step of determining includes determining whether WLAN access to the UE is given priority or not based on the user preference. Additionally, the RAN may be a 3GPP RAN and the indication of the UE status includes 3GPP accessibility information.

As an option, when there is WLAN integration into the telecommunication network (e.g. RAN or core network part), then the step of determining further includes determining whether the associated WLAN access attempt should be allowed or not using the indication information in the WLAN access message. Additionally or alternatively, the step of determining further includes querying a network node or a further network entity in the telecommunications network, RAN, and/or core network part as to whether to allow the UE access to the WLAN.

As another option, the WLAN access message includes any one of the messages or signals from the group of: a Probe Request message; a GAS initial request message; a authentication request message; an association request message; an authentication signal prior to an authentication decision associated with the UE accessing the WLAN; an upstream full authentication signal prior to an authentication decision associated with the UE accessing the WLAN; an upstream re-authentication signal prior to an authentication decision associated with the UE accessing the WLAN; an access signal from UE to WLAN prior to an authentication decision associated with the UE accessing the WLAN. Optionally, the authentication signals are based on EAP-SIM/AKA/AKA' authentication protocols. Additionally or alternatively, the indication of UE status with the telecommunication network is included as a parameter within the WLAN access message. Additionally or alternatively, the indication of UE status with the telecommunications network is included as an extension to an existing parameter within the WLAN access message.

As an option, the WLAN is an IEEE 802.11 WLAN. Optionally, the network entity is for use in the WLAN as a separate entity or node, or included in a WLAN access control node or a wireless access point of the WLAN. As an option, the functionality of the network entity may be included in the telecommunications network when there is WLAN integration with the telecommunications network.

According to a second aspect of the invention there is provided a method of operating a UE in a communications system, the communications system including a WLAN and a telecommunications network comprising a radio access network (RAN) and a core network part. The method includes determining the UE status with the telecommunications network and initiating WLAN access to the WLAN. The UE inserts an indication of the UE status with the telecommunications network in to a WLAN access message and transmits the WLAN access message to the WLAN for use determining whether to allow the UE to access the WLAN.

As an option, the indication of UE status includes RAN accessibility information. As another option, the indication of UE status includes a portion of data from the group of: data representative of whether WLAN only access is active in the UE; data representative of whether RAN access with no coverage is active; data representative of whether RAN access with limited service is active; and data representative of the user preference for the WLAN access attempt. Optionally, the RAN is a 3GPP RAN and the indication of the UE status includes 3GPP accessibility information.

As another option, the WLAN access message includes any one of the messages or signals from the group of: a Probe Request message; a GAS initial request message; a authentication request message; an association request message; an authentication signal prior to an authentication decision associated with the UE accessing the WLAN; an upstream full authentication signal prior to an authentication decision associated with the UE accessing the WLAN; an upstream re-authentication signal prior to an authentication decision associated with the UE accessing the WLAN; an access signal from UE to WLAN prior to an authentication decision associated with the UE accessing the WLAN. As an option, the authentication signals are based on EAP-SIM/AKA/AKA' authentication protocols. Optionally, the indication of UE status with the telecommunications network is included as a parameter within the WLAN access message. Additionally or alternatively, the indication of UE status with the telecommunications network is included as an extension to an existing parameter within the WLAN access message. Optionally, the WLAN is an IEEE 802.11 WLAN.

According to a third aspect of the invention there is provided an entity for use in a communication system, the communication system including a WLAN and a telecommunication network comprising a RAN and a core network part. The entity includes a processor, receiver, transmitter, and memory, the processor being connected to the receiver, transmitter, and memory. The receiver is configured to receive a WLAN access message from a UE. The WLAN access message includes an indication of the UE status with the telecommunications network. The processor is configured to determine from the indication whether to allow the UE to access to the WLAN. As an option, the processor is further configured to detect the indication of UE status within the WLAN access message.

Optionally, the indication of UE status includes RAN accessibility information. As an option, the indication of UE status includes a portion of data from the group of: data representative of whether WLAN only access is active in the UE; data representative of whether RAN access with no coverage is active; data representative of whether RAN access with limited service is active; and data representative of the user preference for the WLAN access attempt. As an option, when there is WLAN integration into RAN, then the processor is further configured to determine whether the associated WLAN access attempt should be allowed by querying a network node or further network entity in the RAN or core network part to determine whether to allow the UE to access to the WLAN.

As an option, the WLAN access message includes any one of the messages or signals from the group of: a Probe Request message; a GAS initial request message; a authentication request message; an association request message; an authentication signal prior to an authentication decision associated with the UE (210) accessing the WLAN; an upstream full authentication signal prior to an authentication decision associated with the UE (210) accessing the WLAN (204); an upstream re-authentication signal prior to an authentication decision associated with the UE (210) accessing the WLAN (204); an access signal from UE to WLAN prior to an authentication decision associated with the UE (210) accessing the WLAN (204). Optionally, the WLAN is an IEEE 802.11 WLAN, or the RAN or core network part is a 3GPP RAN or core network part.

According to a fourth aspect of the invention there is provided a UE for use in a communication system. The communication system includes a WLAN and a telecommunications network including a RAN and a core network part. The UE includes a processor, receiver, transmitter, and memory, the processor being connected to the receiver, transmitter, and memory. The processor is configured to: determine the UE status with the telecommunications network; initiate WLAN access to the WLAN (204); and insert into a WLAN access message an indication of the UE status with the telecommunications network. The transmitter is configured to transmit the WLAN access message to the WLAN for use in determining whether to allow the UE to access the WLAN.

As an option, the indication of UE status includes RAN accessibility information. Optionally, the indication of UE status includes a portion of data from the group of: data representative of whether WLAN only access is active in the UE; data representative of whether RAN access with no coverage is active; data representative of whether RAN access with limited service is active; and data representative of the user preference for the WLAN access attempt.

Optionally, the WLAN access message includes any one of the messages or signals from the group of: a Probe Request message; a GAS initial request message; a authentication request message; an association request message; an authentication signal prior to an authentication decision associated with the UE accessing the WLAN; an upstream full authentication signal prior to an authentication decision associated with the UE accessing the WLAN; an upstream re-authentication signal prior to an authentication decision associated with the UE accessing the WLAN; an access signal from UE to WLAN prior to an authentication decision associated with the UE accessing the WLAN. Optionally, the RAN may be a 3GPP RAN and the indication of the UE status includes 3GPP accessibility information. As an option, the WLAN is an IEEE 802.11 WLAN.

According to a fifth aspect of the invention, there is provided a method for use in operating a further network entity in a telecommunication network comprising a radio access network, RAN, and a core network part. The method includes receiving, from a network entity associated with WLAN, a query message including information associated with a UE. Determining whether to allow the UE access to the WLAN based on the query message. Transmitting the determination of whether to allow the UE access to the WLAN to the network entity associated with the WLAN.

As an option, the method includes detecting an indication of UE status with the telecommunication network within the query, and determining whether to allow the UE to access to the WLAN based on the indication of UE status with the telecommunication network. Optionally, the indication of UE status includes at least a portion of data from the group of: data representative of whether WLAN only access is active in the UE; data representative of whether RAN access with no coverage is active; data representative of whether RAN access with limited service is active; data representative of the user preference for the WLAN access attempt; and RAN or core network accessibility information.

According to a sixth aspect of the invention, there is provided a further network entity for use in a telecommunication network comprising a RAN and a core network part. The network entity including a processor, receiver, transmitter, and memory. The processor being connected to the receiver, transmitter, and memory. The receiver is configured to receive, from a network entity associated with a WLAN, a query message including information associated with a UE. The processor is configured to determine whether to allow the UE to access to the WLAN based on the query message. The transmitter is configured to transmit the determination of whether to allow the UE access to the WLAN to the network entity associated with the WLAN.

As an option, the processor is further configured to detect an indication of UE status with the telecommunication network within the query, and determine whether to allow the UE to access to the WLAN based on the indication of UE status with the telecommunication network. Optionally, the indication of UE status includes at least a portion of data from the group of: data representative of whether WLAN only access is active in the UE; data representative of whether RAN access with no coverage is active; data representative of whether RAN access with limited service is active; data representative of the user preference for the WLAN access attempt; and RAN or core network accessibility information.

The invention provides the advantages of providing the WLAN with an indication of the UE status in the telecommunications network directly to the WLAN, which allows the WLAN to rapidly and efficiently determine whether to allow the UE access to the WLAN. The present invention provides the further advantage that the indication of UE status in the telecommunication network is provided to the WLAN via WLAN access messages at any time during the UE access attempt, in particular, it may be provided earlier than authentication and association with the WLAN for efficiently determining whether the UE may access the WLAN. Should the access attempt be rejected due to the indication of UE status, then this may reduce delays in the UE accessing another WLAN or equivalent services from the telecommunications network. The indication of UE status with the telecommunications network assists the WLAN in prioritizing whether to allow the UE access.

BRIEF DESCRIPTION OF THE DRAWINGS

In order that the invention may be more fully understood, some of the embodiments of the invention will now be described, by way of example only, with reference to the accompanying drawings, in which.

DETAILED DESCRIPTION

Figure 1A:
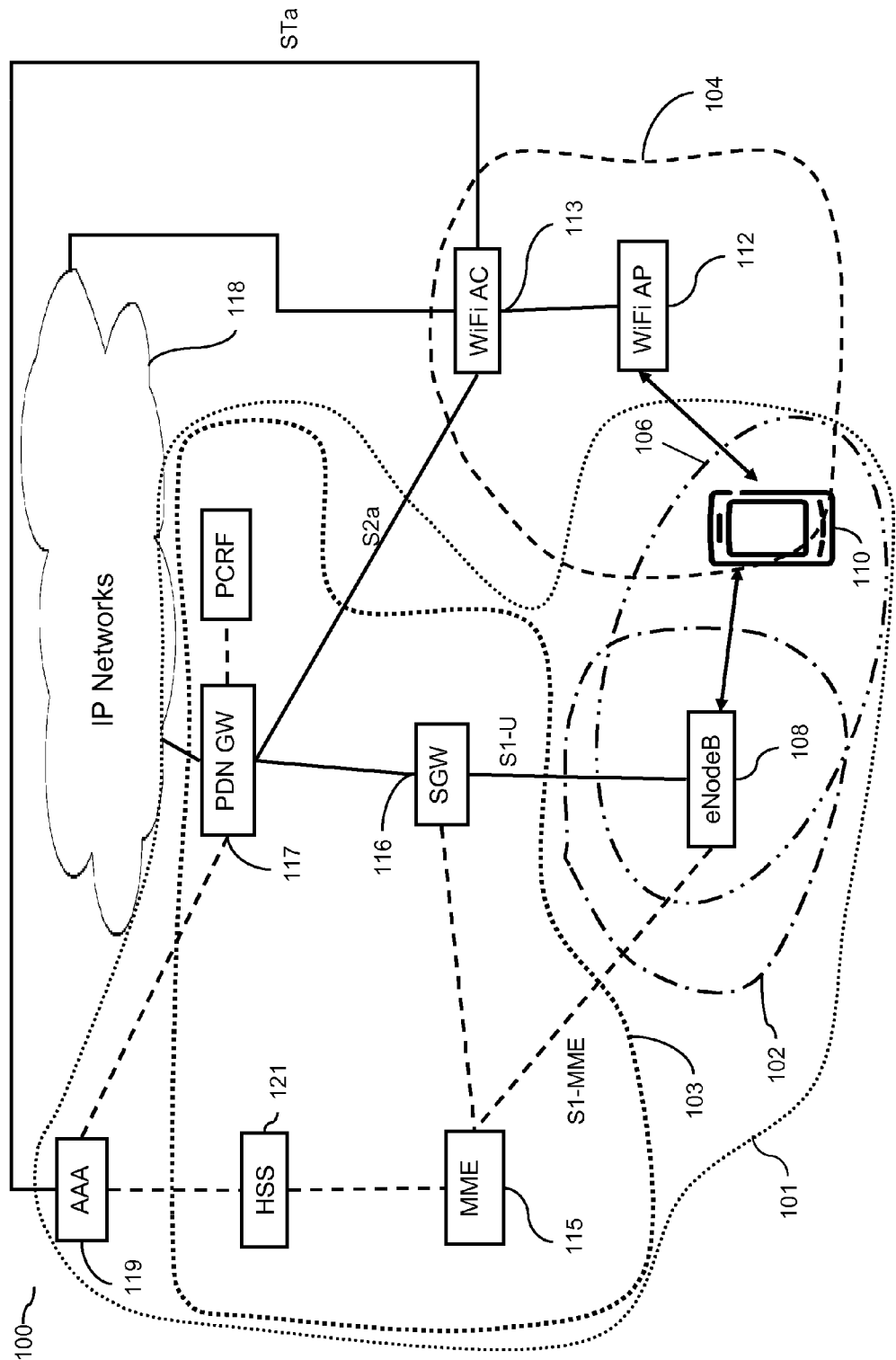
FIG. 1a is a schematic illustration of a communication system including a RAN with a wireless AN.
Figure 1B:
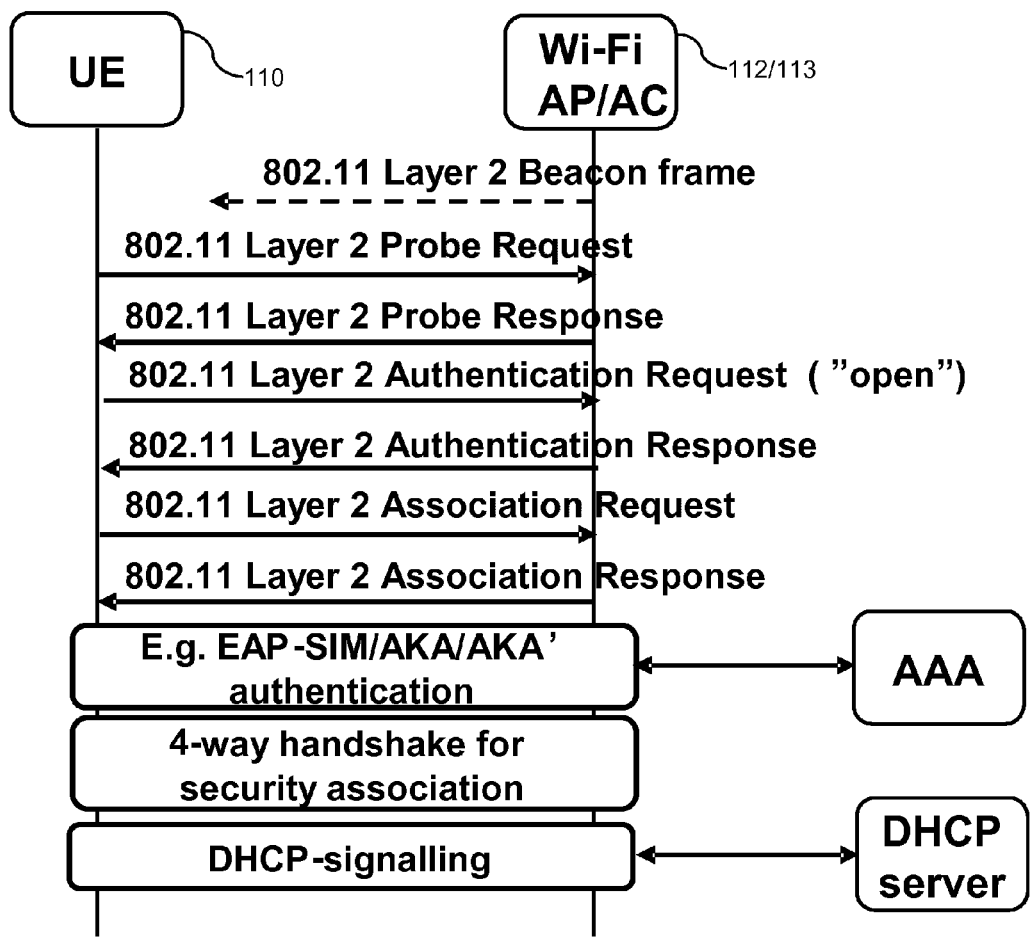
FIG. 1b is a schematic illustration of the WLAN access messages a UE transmits during connection to a WLAN based on IEEE 802.11 standard.
Figure 1C:
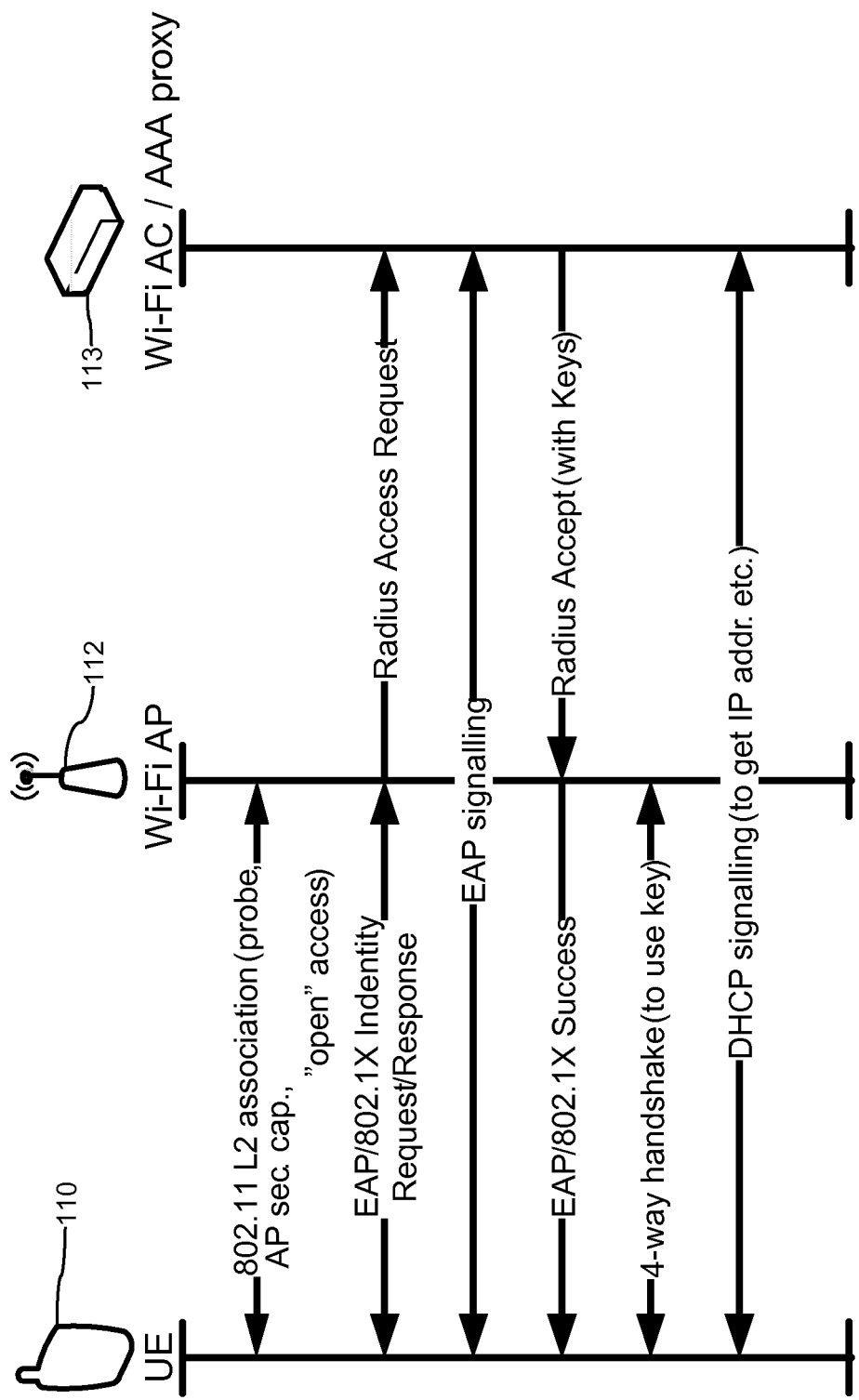
FIG. 1c is a schematic illustration of the WLAN access messages a UE transmits during connection to a WLAN based on IEEE 802.11 standard using EAP authentication.
Figure 1D:
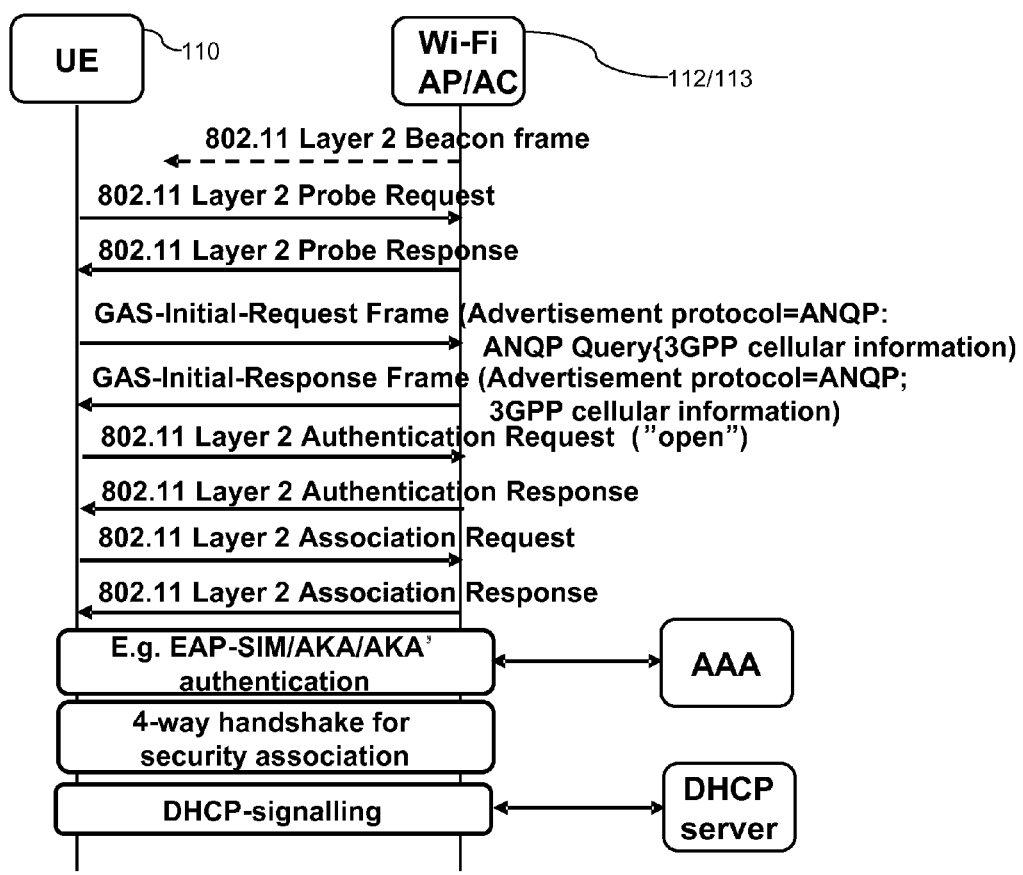
FIG. 1d is a schematic illustration of WLAN access messages a UE transmits during connection to a WLAN when GAS and ANDQP for querying wireless AP for capabilities associated with 3GPP cellular information.

In order to overcome the problems identified above with the present solutions for enabling a UE to initiate/connect with a WLAN, methods and apparatus or network entities are described herein for taking into account the capabilities, preferences, or status of the UE for efficiently determining whether to allow the UE to access the WLAN. The present invention provides the advantages of using the existing mechanisms to take into account changes in the UE status with a telecommunications network to more accurately determine which UE most needs to access the WLAN. Current methods for integration of WLANs with telecommunications networks (e.g. Wi-Fi into 3GPP networks) as described with respect to FIGS. 1a to 1d do not offer good support for WLAN/network controlled Wi-Fi/3GPP RAN access selection. It has been recognised that although more and more devices are capable of using WLANs, it is also important for the WLAN determine or other network node/entity to determine the UEs that may not necessarily be able to receive equivalent data services from a telecommunications network when deciding on whether the UE should access the WLAN. Currently, there is no way for a WLAN or network entity to determine, or for a UE to inform the WLAN or network entity, about the status of the UE with a telecommunication network (e.g. whether the telecommunications network is capable of providing the UE with data services the WLAN may provide and/or whether the UE prefers access to the WLAN instead of the telecommunications network), to determine whether the UE should move between the telecommunication network and WLAN based on knowledge of the different types of network/service access available.

The term UE status with a telecommunications network, UE status information, or UE status with a telecommunications network as described herein may comprise or represent any data representative of network information associated with the UE and/or preference information associated with the UE accessing one or more networks. Examples of the UE status with a telecommunications network that may be used in certain embodiments of the described networks include, by way of example only, data representative of whether WLAN only access is active in the UE, data representative of whether RAN access with no coverage is active, data representative of whether RAN access with limited service is active, data representative of user preference for accessing or not accessing the telecommunications network (e.g. user or UE preferences for WLAN access attempt(s)), RAN or core network accessibility information (e.g. 3GPP accessibility information), identity or an identifier of the UE, UE mobility, load on the telecommunications network, radio link performance for UE in the telecommunications network, radio access technology (RAT) limitations of telecommunications network or other networks, subscription profile of an end user associated with the UE, and/or any other UE status or information related to the preference information, connectivity information, and/or capability information associated with the UE that may be useful for making a decision of whether to allow the UE access one or more networks (e.g. telecommunications network(s) or WLANs etc). Further examples of the UE status or UE status with a telecommunications network are also described below.

The basic concept of the invention is to provide a network entity, apparatus or method/process to determine whether to allow a UE access to a WLAN based on an indication of the status of the UE with a telecommunications network (e.g. coverage, services available, or 3GPP accessibility). The indication of UE status information is provided by the UE to the WLAN, with this information the WLAN or an appropriate network entity in the telecommunications network and/or the WLAN can determine whether to give the UE priority to access the WLAN (e.g. for a UE capable of accessing a 3GPP network but not having, for some reason, 3GPP accessibility). The indication information may be useful in the case of a WLAN integration into RAN of the telecommunication network (e.g. 3GPP RAN) such that a decision may be taken at the WLAN based on information from the UE and also access decision information from the telecommunication network (e.g. 3GPP RAN side) associated with the UE.

For example, the UE may indicate to the WLAN its status with a telecommunication network (e.g. 3GPP accessibility) within one or more WLAN access message(s) transmitted to the WLAN when the UE initiates/connects with the WLAN. As an example, for a 3GPP capable UE, the UE may place 3GPP accessibility information into the WLAN access message. This information may be placed in a request message in the message sequence during the UE initiation/connection attempt to the WLAN. For example, the following request messages from FIGS. 1b-1d, and/or any future WLAN or IEEE 802.11 based request messages from the UE, may be used:

A new parameter or extension of existing parameter(s) in a Probe Request message;
A new parameter or extension of existing parameter(s) in a GAS initial request message;
A new parameter or extension of existing parameter(s) in an IEEE 802.11 authentication request message;
A new parameter or extension of existing parameter(s) in association request message;
A new parameter or extension of existing parameter(s) in any upstream EAP-SIM/AKA/AKA' authentication signal, before the response to the authentication decision (passed/failed) is returned; and
A new signal or request message transmitted from the UE to WLAN, before the response to the authentication decision (passed/failed) is returned.

The 3GPP accessibility information may include data representative of the following:
1. "WLAN only packet switched access active in the UE", which indicates that the WLAN access attempt should most likely be allowed, if possible;
2. "Both WLAN and 3GPP active but the status in 3GPP is either 'no coverage' or 'limited service state'", which indicates that the WLAN access attempt should most likely be allowed, if possible; and
3. "The WLAN access attempt is triggered by end user's preference", which indicates that the WLAN may decide whether the end user preferred access should be given priority or not.

Once the 3GPP accessibility information is detected in the WLAN access message(s) transmitted from the UE and thus received in the WLAN, the information may be used by the WLAN to determine, when there is no WLAN integration into the telecommunication network (e.g. no Wi-Fi integration into RAN solution deployed), whether the associated access attempt should be allowed or not. Additionally or alternatively, when there is a form of WLAN integration into the telecommunication network (e.g. a Wi-Fi integration into RAN solution deployed as in FIG. 1a), the information may be forwarded by the WLAN to the different components of the integrated solution (e.g. to components in the telecommunication network such as RAN or core network parts), where a decision may be taken in those components of the telecommunications network whether to allow the UE access to the WLAN. The decision taken is then forwarded to the WLAN, which may take this decision into account, or action this decision, or combine this decision with the UE status information when determining whether to allow the UE access to the WLAN.

Figure 2A:
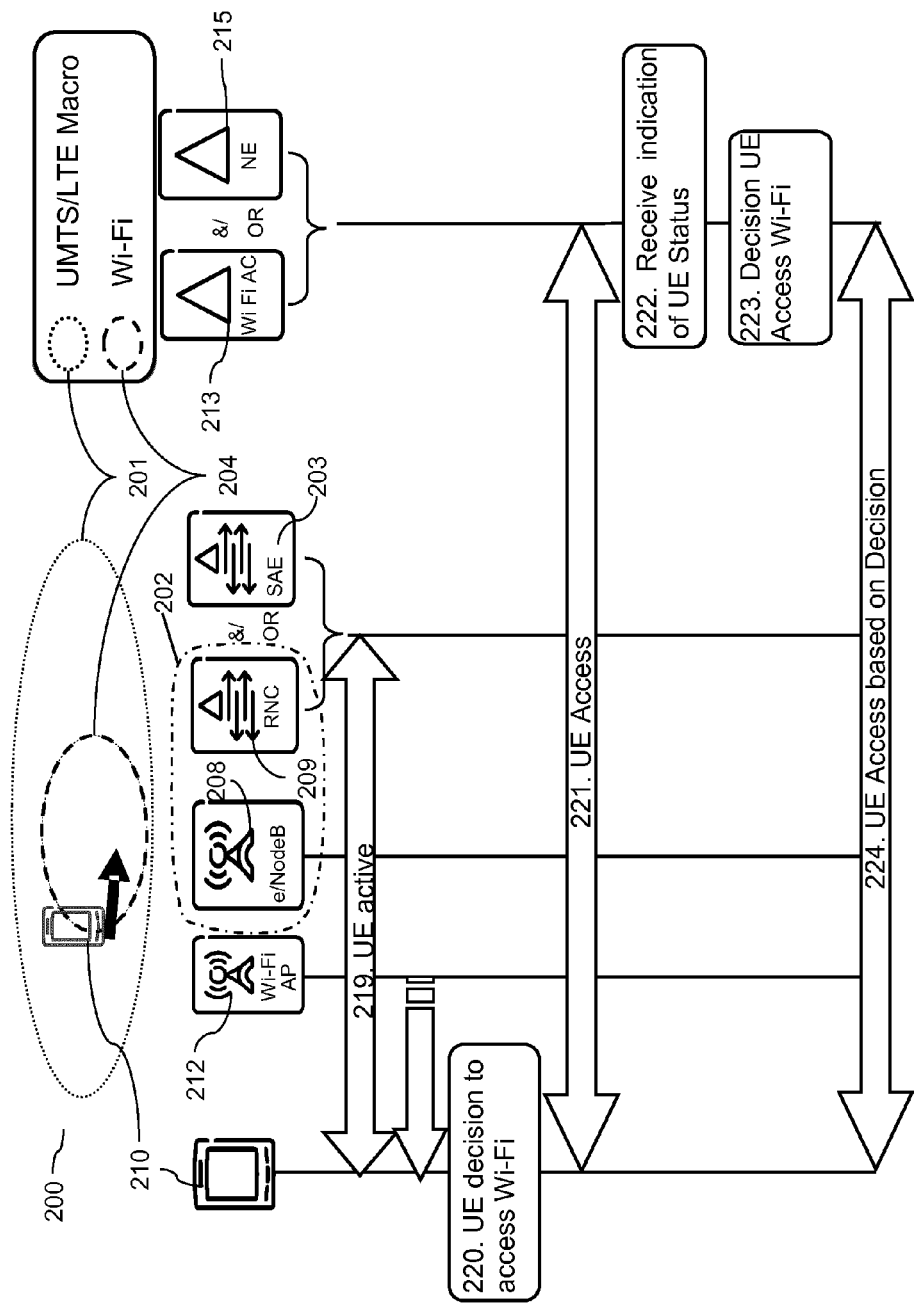
FIG. 2a is a signal flow diagram of an example process according to the invention when a UE connects to a WLAN.

FIG. 2a is a signalling flow diagram illustrating a process for use in a communication system 200 by a UE 210 and a network entity 215. The communication system 200 includes a telecommunication network 201 and a WLAN 204 (e.g. an IEEE 802.11 WLAN). In this example, the telecommunication network 201 is a combined UMTS and LTE network. The telecommunication network 201 includes a RAN 202 and core network part(s) 203. The RAN 202 includes, but is not limited to, one or more base station(s) 208 serving or supporting the UE 210, in this example, the base station 208 can be an e/NodeB, which is an eNodeB (eNB) for the LTE network or a NodeB (NB) for the UMTS network. The RAN 202 also includes an radio network controller (RNC) 209 for the UMTS network. The core part 203 may be based, for the LTE network, on the System Architecture Evolution (SAE) core network architecture for 3GPP LTE wireless communication standard. The WLAN 204 includes, but is not limited to, a wireless AP 212 (e.g. a Wi-Fi AP), wireless AC 213 (e.g. a Wi-Fi AC) and the network entity 215. The network entity 215 may be a standalone entity in the WLAN, or it may be part of the wireless AP 212 or wireless AC 213. In FIG. 2a, the WLAN 204 is not integrated with telecommunication network 201.

Figure 2B:
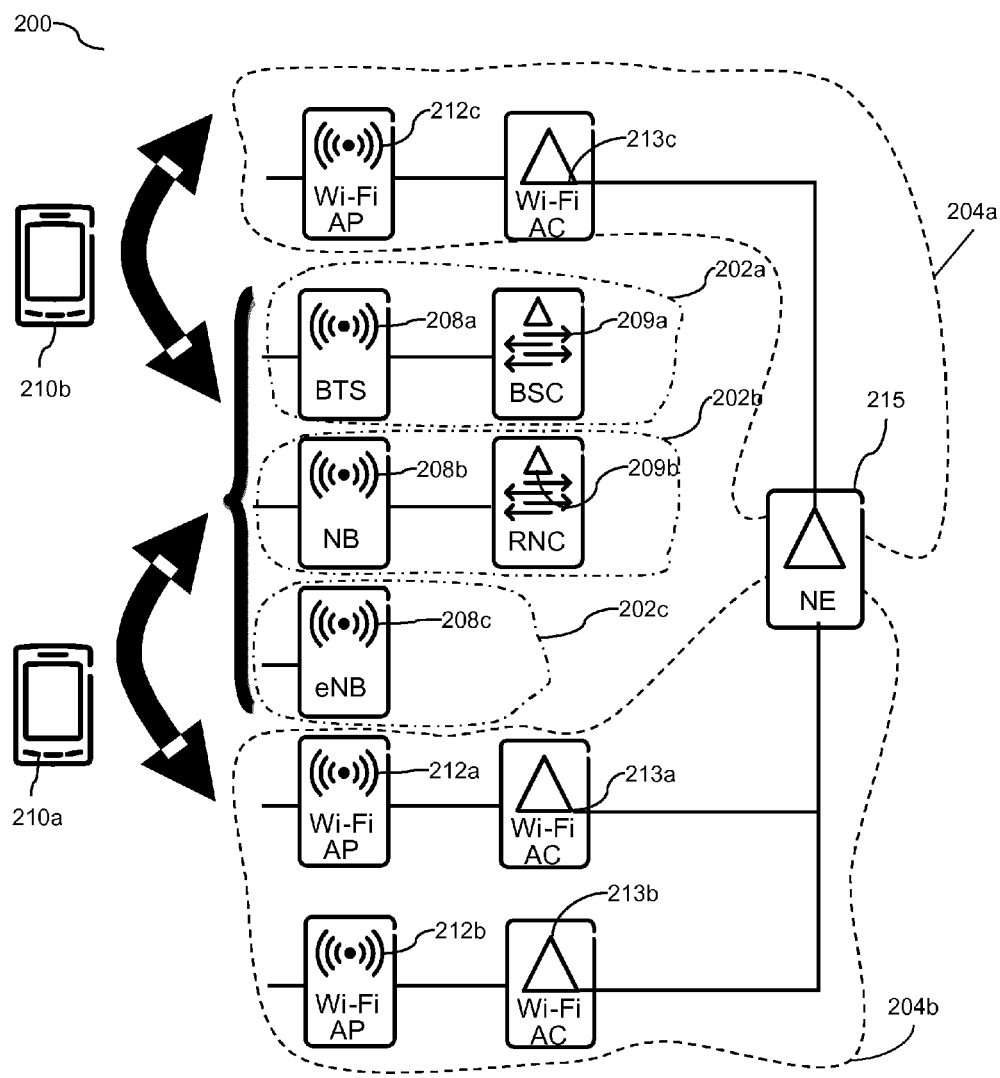
FIG. 2b is a schematic illustration of an example network entity according to the invention in a communication system including several RANs and WLANs.
Figure 2C:
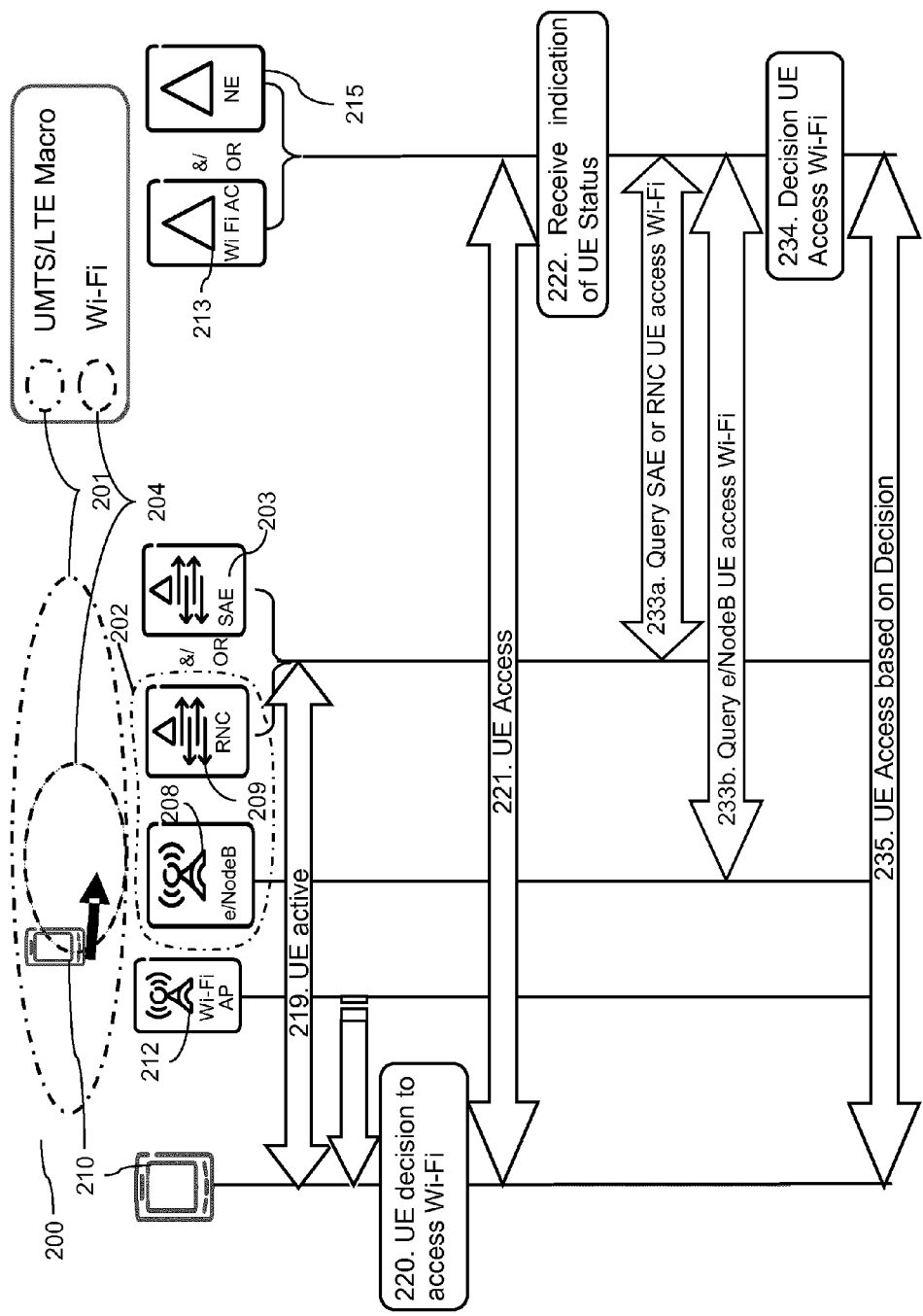
FIG. 2c is a signal flow diagram of another example process according to the invention with a WLAN integrated with a telecommunication network.
Figure 2D:
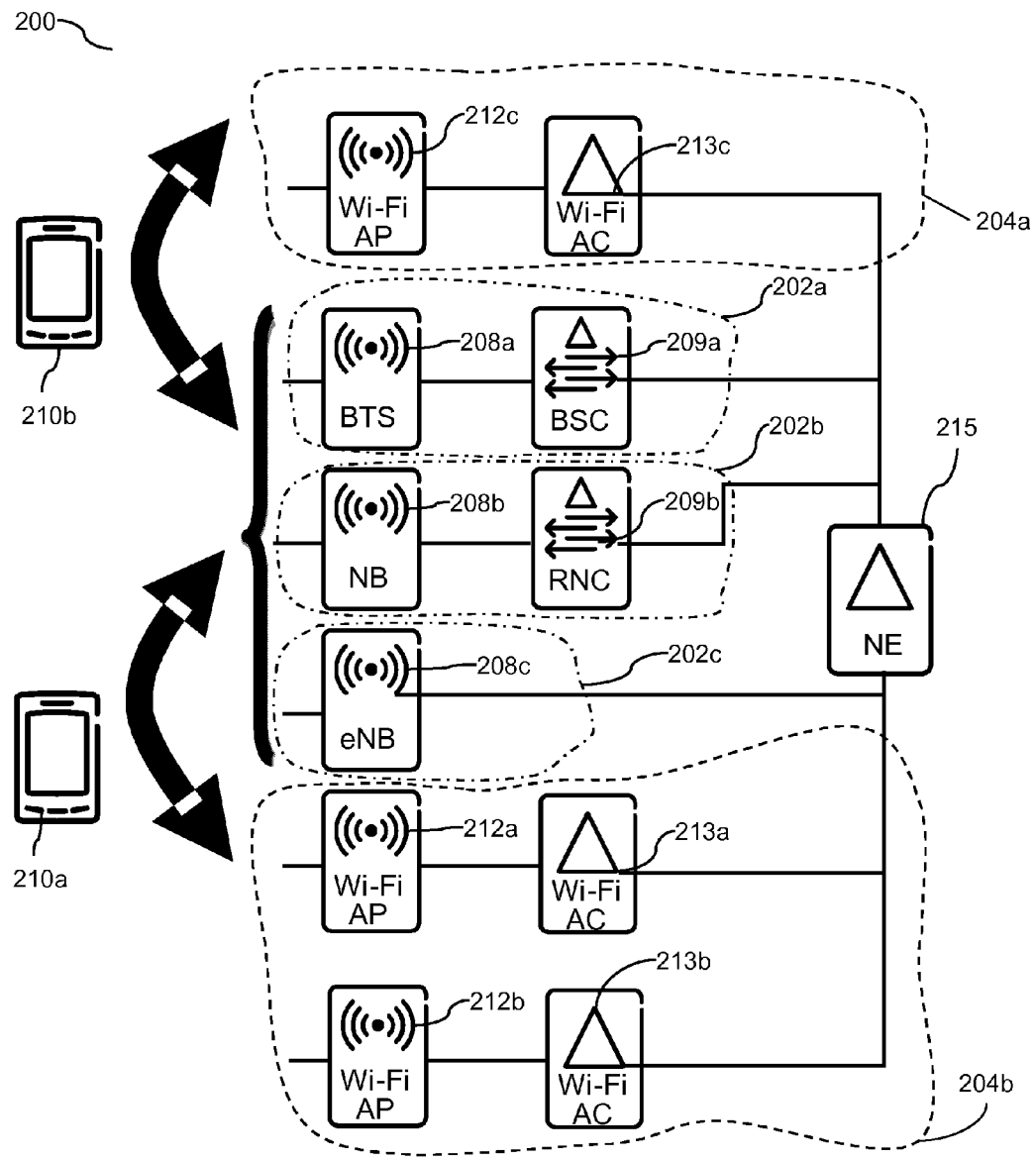
FIG. 2d is a schematic illustration of example network entities according to the invention with several RANs integrated with several WLANs.

For simplicity, the same or similar reference numerals used in FIG. 2a are reused in FIGS. 2b, 2c, and 2d identifying the same or similar UEs, networks, network nodes, elements or entities and the like. FIG. 2b is a schematic illustration of another example of communication system 200 including a network entity 215 according to the invention, the communication system 200 with WLANs 204a and 204b not integrated with several RANs 202a, 202b, 202c of several telecommunication networks.

Figure 2E:
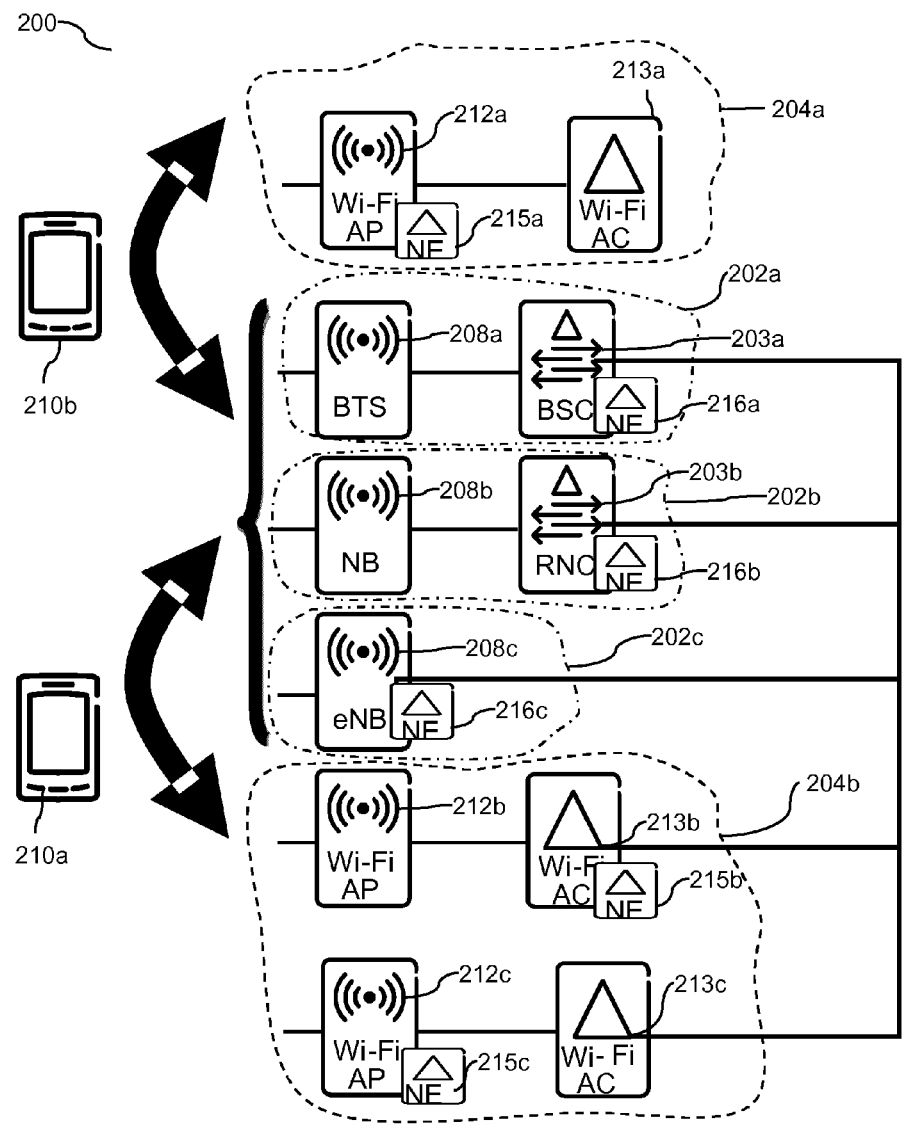
FIG. 2e is a schematic illustration of another example of network entities according to the invention with several RANs integrated with WLANs.

FIG. 2c is another signal flow diagram illustrating another example process for use in communication system 200 by UE 210 and network entity 215 when the WLAN 204 is integrated with telecommunication network 201. FIG. 2d is a schematic illustration of another example of communication system 200 including a network entity 215 according to the invention, with WLANs 204a and 204b integrated with several RANs 202a, 202b, 202c of several telecommunications networks. FIG. 2e is a further illustration of an example communication system 200 including multiple network entities 215a-215c and further network entities 216a-216c according to the invention.

Although these examples describe several deployment options, it is to be appreciated by the person skilled in the art that there are multiple ways and arrangements for connecting network elements or nodes (e.g. base stations 208 & 208a-208c, RANs 202a-202c, wireless APs 212 & 212a-212c, and wireless ACs 213 & 213a-213c) of a communication system with network entities 215, 215a-215c. In essence, the network entities 215 & 215a-215c may be connected or located in the communication system 200 such that it is in communication with the WLAN 204 (e.g. via wireless ACs 213 &/or 213a-213c or APs 212, &/or 212a-212c) and a telecommunication networks (e.g. via RANs 202, 202a-202c, or core network parts 203).

Referring to FIG. 2a, in this example, the RAN 202 is a 3GPP RAN e.g. UMTS/LTE in which the base station 208 serves UE 210. In step 219, the UE 210 is in communication with the telecommunication network 201 and registers with the RAN 202 (e.g. eNodeB 208 or RNC 209) and/or core network part(s) 203 (e.g. SAE). The UE 210 may also communicate over the telecommunication network 201 via base station 208. At some point in time, in step 220, the UE 210 may decide to connect to WLAN 204 and access the WLAN 204 via wireless AP 212. This may be due to the UE status in the telecommunications network 201. For example, the UE status may indicate that it is the user's preference to connect to the WLAN 204, and/or UE 210 may have limited 3GPP accessibility or limited coverage/services with telecommunications network 201, and/or UE 210 may have moved out of coverage of base station 208 or the 3GPP network and so cannot access any data services from telecommunications network 201. Alternatively, the UE status in the telecommunication network 201 may actually be on with full 3GPP accessibility to telecommunications network 201 (e.g. full coverage). In any event, the UE 210 determines the UE status with the telecommunications network 201 (e.g. with RAN part(s) 202 such as eNodeB 208 for LTE network and/or RNC 209 for UMTS network, or core network part 203 such as SAE for the LTE network).

In step 221, the UE 210 initiates/connects an access attempt with WLAN via wireless AP 212 and wireless AC 213. In doing so, the UE 210 sends the UE status in the telecommunication network by inserting into a WLAN access message an indication of the UE status with the telecommunication network. As previously described, the WLAN access message may include any one of the messages, requests, or signals used by the UE 210 when initiating/connecting to the WLAN 204. For example, the WLAN access message may be any message, request, or signal from the group of: a Probe Request message; a GAS initial request message; an authentication request message; an association request message; an authentication signal (e.g. signals based on EAP-SIM/AKA/AKA' authentication protocols.) prior to an authentication decision associated with the UE 210 accessing the WLAN 204; an upstream full authentication signal prior to an authentication decision associated with the UE 210 accessing the WLAN 204; an upstream re-authentication signal prior to an authentication decision associated with the UE 210 accessing the WLAN 204; an access signal from UE 210 to WLAN 204 prior to an authentication decision associated with the UE 210 accessing the WLAN 204; or any other request, message or signal that transmitted from UE 210 as part of the initiation/connection procedure to WLAN 204.

The indication of UE status may include a portion of data from the group of: data representative of whether WLAN only access is active in the UE; data representative of whether RAN access with no coverage is active; data representative of whether RAN access with limited service is active; and/or data representative of the user preference for the WLAN access attempt. When the RAN 202 is a 3GPP RAN, then the indication of the UE status may include 3GPP accessibility information. The indication of UE status may be included as a parameter within the WLAN access message, or as an extension to an existing parameter within the WLAN access message.

In step 222, the network entity 215 receives the WLAN access message from UE 210. The network entity 215 may be a network element within WLAN 204, or it may be part of the wireless AC 213. As the WLAN access message includes an indication of the UE status with telecommunications network 201. The network entity 215 uses the indication of UE status to determine whether to allow UE 210 access to the WLAN 204. The network entity 215 may include functionality to detect the indication of UE status within the WLAN access message.

In step 223, the network entity 215 makes a decision as to whether to allow UE 210 access to the WLAN 204. For example, the indication of UE status may include information associated with the UE status with the RAN 202 of telecommunications network 201, (e.g. RAN accessibility or 3GPP accessibility information), which may include data representative of whether WLAN only access is active in the UE 210, in which in step 223 the network entity makes the decision (determines) to allow the UE 210 access to the WLAN. The indication of UE status may include data representative of whether RAN access with no coverage is active, in which the step 223 makes the decision (determines) to allow the UE 210 access to the WLAN.

Alternatively or additionally, the indication of UE status may further include data representative of whether RAN access with limited service is active, then the step 223 makes the decision (determines) to allow the UE 210 access to the WLAN 204. The indication of UE status may further include data representative of the user preference for the WLAN access attempt, and step 223 may then take this information into account when determining whether WLAN access to the UE is given priority or not based on the user preference, which may not be guaranteed due to the requirements of other UEs (not shown) attempting access to WLAN 204. If the indication of UE status includes data representative of full coverage or full 3GPP accessibility to the telecommunications network 201, then the network entity 215 may allow UE 210 to access the WLAN 204 depending on the load of WLAN 204 and/or the requirements of other UEs (not shown). For example the other UEs may have a higher priority for accessing the WLAN 204 (e.g. these UEs may have one of the above allowable conditions, e.g. WLAN only access active, or RAN access with limited service, or RAN access with no coverage). Alternatively, the WLAN may have a maximum limit for the number of UEs connected to it, if this limit is reached then no new UEs may be allowed, or UEs that may be better served by the telecommunications network may be rejected or UEs with only WLAN capability (at that time) could be allowed over UEs with full 3GPP accessibility.

In step 224, once a decision has been made as to whether to allow UE 210 to access the WLAN 204, the WLAN 204 can send a response to the UE 210 either accepting or rejecting the UE access attempt. The time the response is sent may depend on where in the initiation/connection procedure that the UE 210 and WLAN 204 have completed. If the decision is to reject the UE access attempt, then this may be transmitted immediately to the UE 210, even prior to the steps of authentication/association in the initiation/connection procedure. However, if the WLAN decision is to allow the UE 210, then subject to the UE 210 and WLAN performing the remainder of the initiation/connection procedure (if necessary), the WLAN 204 can send a response to the UE 210 accepting the UE access attempt. In any event, based on the decision, if the WLAN 204 accepts the UE access attempt, then in step 224 the UE 210 accesses the WLAN 204. Otherwise, the UE 210 may try another WLAN 204 to access, or access the equivalent data services via the telecommunications network 201.

FIG. 2b is a schematic illustration of another example of a network entity 215 according to the invention in a communication system 200 including several telecommunications networks (e.g. several RANs 202a-202c) and WLANs 204a-204b. In this example, the WLANs 204a-204b are not integrated with the telecommunication networks. The communication system 200 includes a first and a second UE 210a and 210b in communication with at least one of several RANs 202a, 202b, 202c and/or several wireless networks 204a and 204b. In this example, the communication system 200 includes a GSM RAN 202a including a base station 208a and base station controller (BSC) 209a, a WCDMA RAN 202b including a nodeB 208b and a radio network controller (RNC) 209b, and a 3GPP RAN 202c including a enodeB 208c. The WLANs 204a-204b are in communication with the network entity 215. The wireless network 204a includes a wireless AP 212a based on Wi-Fi or the IEEE 802.11 standard and a corresponding wireless AC 213a. The wireless network 204b includes a first wireless AP 212b and a second wireless AP 212c and corresponding wireless ACs 213b and 213c. For simplicity, the core network elements connecting the RANs 202a-202c to further IP networks (e.g. IP networks 218) are not shown.

Network entity 215 may include some or all of the functionality of the processes or network entities as described with reference to FIG. 2a and/or FIGS. 2d, 3a-5b. As the WLANs 204a-204b are not integrated with the telecommunication networks/RANS 202a-202c, this means that network entity 215 relies on the indication of UE status with telecommunication networks/RANs 202a-202c transmitted from the UE in one or more of the WLAN access messages when initiating/connecting to a WLAN 204a-204b. Each of UEs 210a and 210b may be in communication with one of the RANs 202a-202c and can determine the UE status with the respective telecommunication network. UE 210a or 210b may then access the WLAN 204a or 204b via wireless APs 212a-212c by initiating an access attempt with the respective WLAN 204a-204b. The UE 210a and 210b may be configured to include the indication of UE status with in a WLAN access message or signal (as described with reference to FIGS. 2a and/or 2e-5b) such that the WLAN message is forwarded by WLAN 204a-204b to network entity 215 for use in detecting the indication of UE status and determining whether to allow the UE access to a WLAN 204a-204b based on the indication as described with reference to FIGS. 2a, 2d-5b.

FIG. 2c is another signal flow diagram illustrating another example process for use in communication system 200 by UE 210 and network entity 215 as described with reference to FIG. 2a. In this example, the communication system 200 is arranged such that there is WLAN integration into the telecommunications network 201 (e.g. WLAN integration into RAN 202 via either RNC 209 for UMTS networks or eNodeB 208 for LTE networks, or WLAN integration into core network part 203 via SAE for LTE networks). The WLAN integration into a telecommunications network was illustrated in FIG. 1a (e.g. via an S2a interface between wireless AC 113 and core network part 103). In communication system 200, this is illustrated by the communication signals/arrows illustrated by steps 233a and 233b, which indicate there are communication paths connecting the Wireless AC 213 and/or the network entity 215 to the RAN 202 via RNC 209 for UMTS networks or eNodeB 208 for LTE networks, and/or the core network part 203 via SAE for LTE networks. The steps 219-221 performed by the UE 210 are the same or similar to the steps 219-221 as described with reference to FIG. 2a and step 222 performed by the network entity 215 is the same or similar to step 222 as described with reference to FIG. 2a.

If the WLAN 204 is integrated with the telecommunication network 201 via core network parts 203 (e.g. SAE for LTE network) then in step 233a the network entity 215 sends a query towards core network part 203 for determining whether the WLAN should allow the UE access to WLAN 204 based on the received UE status. If the WLAN 204 is integrated with the telecommunication network 201 via RAN 202 using RNC 209 for UMTS network, then in step 233a the network entity 215 sends a query towards RNC 209 for a decision or device-related information for use in determining whether the WLAN should allow the UE access to WLAN 204 based on the received UE status. If the WLAN 204 is integrated with the telecommunication network 201 via RAN 202 using eNodeB 208 for the LTE network, then in step 233b the network entity 215 sends a query to eNodeB 208 for a decision or device-related information for use in determining whether the WLAN 204 should allow the UE access to WLAN 204 based on the received UE status. The query may be forwarded to a further network entity (not shown) in the telecommunication network 201 (not shown) for making the decision depending on the information in the query e.g. the indication of UE status with the telecommunications network 201 and also the identity of UE 210, and responds with the decision of whether the WLAN 204 should allow UE 210 access.

For example, the telecommunication network 201 may include a further network entity (not shown) or node therein (e.g. in RAN 202 or core network part(s) 203) that may be configured to receive the query or a request for device-related network information from the WLAN 204 or network entity 215. In addition to the UE status with the telecommunication network 201, the query may include including at least an identifier of the UE 210. The further network entity is then configured to use the identifier of the UE 210 and the UE status or UE-related network information with the RAN 202 or eNodeB 208 and/or core network part 203 to obtain a decision or further device-related network information for use in determining whether UE 210 may access the WLAN 204. The further network entity is then configured to send a response including the obtained decision (or device-related information) to the network entity 215 or WLAN 204. The steps implemented by a further network entity in the telecommunication network 201 to obtain the decision or further device-related network information is beyond the scope of the methods described herein; however, PCT/SE2012/051007 describes exemplary methods and apparatus that would be suitable for providing the functionality of a further network entity that can generate a decision or further device-related information based on an identifier of the UE 210 and/or the UE status with the telecommunication network 201.

As an example, if the indication of UE status is associated with the LTE network, then the query may be directed towards core network part 203 (e.g. SAE) or RAN part 202 such as eNodeB 208. If the indication of UE status is associated with the UMTS network, then the query may be directed towards the RAN part 202 (e.g. RNC). In any event, the telecommunications network 201 may receive a query from network entity 215 for a decision as to whether the UE may access the WLAN 204. The query may include the indication of UE status informing the telecommunication network 201 of the status of the UE, e.g. that the user prefers to access the WLAN or due to connectivity issues with the telecommunications network 201. This allows the telecommunications network 201 (e.g. the RAN or core network parts 202/203) to take the user preference or a manual override into account, which can impact the decision made in the telecommunication network 201 to allow or reject the UE 210 to access the WLAN 204. The telecommunication network 201 responds to the query to allow or reject the UE's access attempt depending on the UE status. In step 234, the network entity 215 makes a decision as to whether to allow UE 210 access to the WLAN 204 based on the UE status and/or the response from the telecommunication network 201.

In step 235, once a decision has been made by the WLAN 204 (e.g. by network entity 215) as to whether to allow UE 210 to access the WLAN 204, and after the UE 210 and WLAN 204 has performed any further relevant steps/communications for the initiation/connection procedure (if necessary), the WLAN 204 sends a response to the UE 210 either accepting or rejecting the UE access attempt. For example, if the response from the telecommunications network 201 is to reject the UE access attempt (e.g. because the UE is better served by the telecommunications network 201) and this is received prior to the steps of the UE authentication/association with the WLAN 204, then the WLAN 204 may send a response rejecting the UE access attempt immediately and prior to the authentication/association steps. Alternatively, if the WLAN decides to allow the UE access attempt based on the UE status information and/or the response from the telecommunications network 201, then depending on the remaining authentication and/or association steps the WLAN may simply send an authentication/association response indicating acceptance of the UE access attempt. Based on the decision, if the WLAN 204 accepts the UE access attempt, then in step 235 the UE 210 accesses the WLAN 204. Otherwise, the UE 210 may try another WLAN 204 to access, or access data services via telecommunications network 201.

FIG. 2d is a schematic illustration of another example of a network entity 215 according to the invention in a communication system 200 including several telecommunications networks (e.g. several RANs 202a-202c) and WLANs 204a-204b. The communication system 200 includes a first and a second UE 210a and 210b in communication with at least one of several RANs 202a, 202b, 202c and/or several WLANs 204a and 204b. In this example, the communication system 200 includes a GSM RAN 202a including a base station 208a and base station controller (BSC) 209a, a WCDMA RAN 202b including a nodeB 208b and a radio network controller (RNC) 209b, and a 3GPP RAN 202c including a enodeB 208c. The WLAN 204a includes a wireless AP 212a based on Wi-Fi or the IEEE 802.11 standard and a corresponding wireless AC 213a. The WLAN 204b includes a first wireless AP 212b and a second wireless AP 212c and corresponding wireless ACs 213b and 213c.

The WLANs 204a-204b are in communication with the network entity 215 over communication paths represented by the solid lines. In this example, the WLANs 204a-204b are integrated with one or more telecommunication network(s) illustrated by communication paths represented by solid lines between network entity 215 and the RANS 202a-202c of the telecommunication network(s). Although all of the RANS 202a-202c of the telecommunication network(s) are shown to be connected via a communication path to network entity 215, it is to be appreciated by the skilled person that one or more of the RANs 202a-202c may not be connected/integrated with one or more of the WLANs or network entity 215, and in such cases, network entity 215 may operate as described with reference to FIGS. 2a and 2b.

For simplicity, the core network elements connecting the RANs 202a-202c to further IP networks (e.g. IP networks 218) or even the network entity 215 and/or the WLANs 204a-204b are not shown. Depending on the level of integration of the WLANs 204a-204b and/or network entity 215 with the telecommunication network(s) (e.g. RANs 202a-202c), network entity 215 may include some or all of the functionality of the processes or network entities as described with reference to FIGS. 2a-5c.

When WLANs 204a-204b and/or network entity 215 is integrated with telecommunication network(s) as illustrated in FIG. 2d, each of UEs 210a and 210b may be in communication with one of the RANs 202a-202c and are able to determine the UE status with the respective telecommunication network. UE 210a may initiate an access attempt or connection with WLAN 204b wireless APs 212a-212b. UE 210b may also initiate an access attempt or connection with WLAN 204a via wireless AP 212c. UEs 210a and 210b may be configured to include the indication of UE status with their respective telecommunication network(s). In this example, UE 210a may provide an indication of its status with respect to RAN 202c and UE 210b may provide an indication of its status with RAN 202a within one or more WLAN access message(s) or signal(s) as described with reference to FIGS. 2a-2c and/or 2e-5b. The WLAN access messages from UE 210a and/or UE 210b will be forwarded by WLANs 204b and 204a to network entity 215 for determining whether to allow the UEs 210a-210b access to the corresponding WLAN 204a-204b.

In this example, as network entity 215 and/or WLANs 204a-204b are integrated with RANS 202a-202c, then network entity 215 can query RAN 202c to determine whether UE 210a should access WLAN 204b (e.g. as described in step 233 of FIG. 2c), network entity 215 can also query RAN 202a to determine whether UE 210b should access WLAN 204a (e.g. as described in step 233 of FIG. 2c). Based on the response from RAN 202a and/or the UE 210a status with RAN 202c, network entity 215 makes a decision whether to allow or reject UE 210a accessing WLAN 204b (e.g. as described in step 234 of FIG. 2c). Based on the response from RAN 202c and/or the UE 210b status with RAN 202a, network entity 215 makes a decision whether to allow or reject UE 210b accessing WLAN 204a (e.g. as described in step 234 of FIG. 2c). Depending on the decision, network entity 215 allows or rejects the access attempt by UE 210a and allows or rejects the access attempt by UE 210b.

Additionally, the telecommunication network(s) associated with RANs 202a and 202c may include further network entities (not shown) that are configured to receive the queries from network entity 215. For example, a further network entity for use in the telecommunication network(s) may receive, from the network entity 215, a query message associated with UE 210a attempt to access WLAN 204b, the query message including information associated with UE 210a. Based on the UE information, the further network entity in the telecommunication network may determine whether to allow the UE 210a to access to the WLAN 204b. The further network entity may detect an indication of UE status within the query, and from this, form a decision for use in determining whether to allow the UE access to the WLAN.

As described previously, the steps implemented by the further network entity in the telecommunication network 201 to obtain the decision or further device-related network information is beyond the scope of the methods described herein; however, PCT/SE2012/051007 describes exemplary methods and apparatus that would be suitable for providing the functionality so that the further network entity can generate or form a decision (or further device-related information) based on an identifier of the UE 210 and/or the UE status with the telecommunication network 201. The further network entity responds to the query by transmitting the decision (or further device-related information) for use in determining whether to allow the UE 210a access to the WLAN 204b to the network entity 215 (which is associated with the WLAN 204b).

Although the telecommunication network(s) may include such further network entities, it is to be appreciated by the person skilled in the art that network entity 215 may include some or all of the functionality of these further network entities in the telecommunications network such that network entity 215 may be able to determine in a similar fashion as the further network entities whether UE 210a should access WLAN 204*b* based on the indication of UE status with the telecommunications network(s).

FIG. 2*e* is a schematic illustration of another example of network entities 215*a*-215*c* according to the invention and further network entities 216*a*-216*c* according to the invention in a communication system 200 including several telecommunications network(s) (e.g. several RANs 202*a*-202*c*) and WLANs 204*a*-204*b*. In this example, the WLAN 204*a* is not integrated with the telecommunication network(s) but the wireless AP 212*a* includes network entity 215*a* that comprises the functionality of network entities as described with reference to FIGS. 2*a*-2*b* and/or 3*a*-5*b*. The WLAN 204*b* is integrated with the telecommunication network(s) as shown by the solid communication paths between wireless ACs 213*a*-213*b* and RANs 202*a*-202*c*. In WLAN 204*b*, wireless AP 212*c* includes network entity 215*c* and wireless AC 213*b* includes a network entity 215*b* each of which may include the functionality of the network entities as described with reference to FIGS. 2*c*-2*d* and/or 3*a*-5*b*. In addition RANs 202*a*-202*c* include further network entities 216*a*-216*c* that include the functionality of the further network entities in the telecommunication network(s) as described with respect to at least FIGS. 2*d*, 3*c* and 5*c*.

Figure 3A:
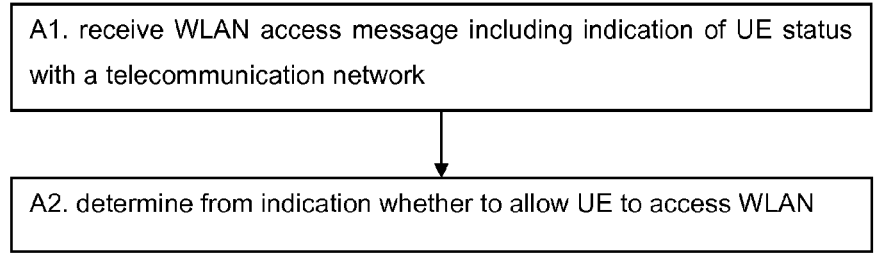
FIG. 3a is a flow diagram illustrating an example process according to the invention.

FIG. 3*a* is a flow diagram illustrating an example process performed by a network entity according to the invention. The steps of the process are as follows:

A1. The network entity receives a WLAN access message from or associated with a UE including an indication of UE status with a radio access network or a telecommunication network. The WLAN access message may be one of the messages or requests transmitted by the UE to the WLAN during access initiation/connection (access attempt) with the WLAN. The indication of UE status may be as described with reference to FIGS. 2*a*-2*b* and 3*b*-5*b*.

A2. The network entity determines whether to allow the UE to access the WLAN, and sends a response to the UE allowing/rejecting the UE's access attempt to the WLAN depending on the decision.

Figure 3B:
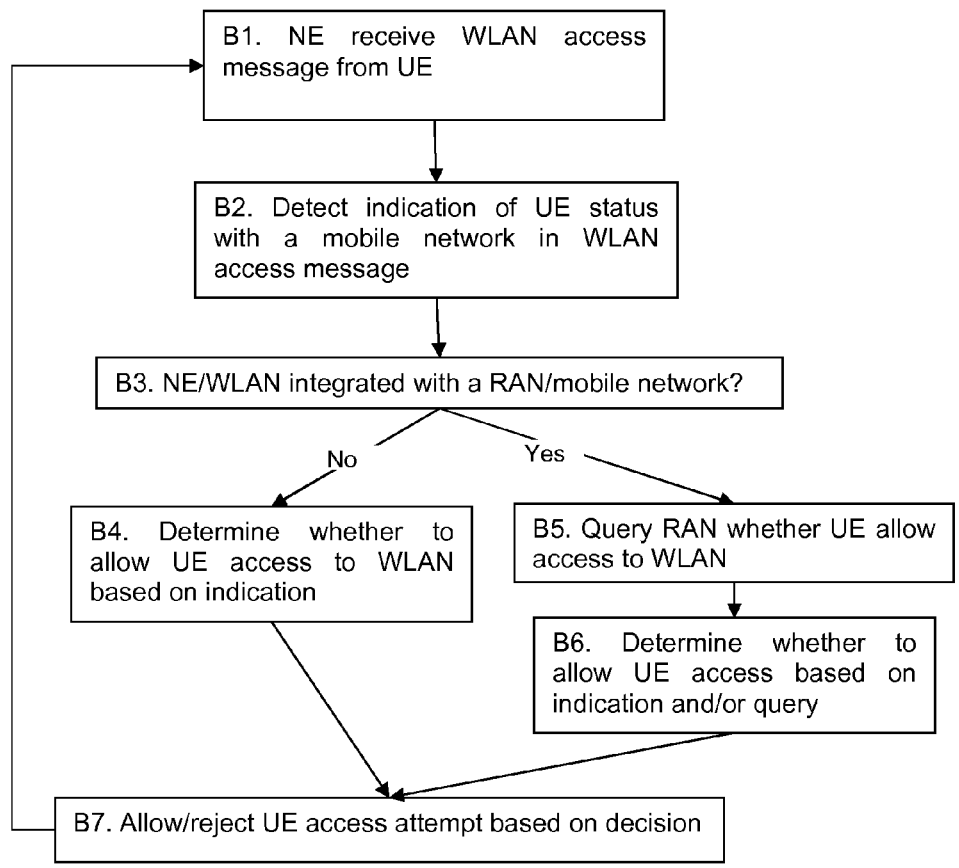
FIG. 3b is a flow diagram illustrating another example process according to the invention.

FIG. 3*b* is a flow diagram illustrating another example process performed by a network entity according to the invention. The steps of the process are as follows:

B1. The network entity (NE) receives a WLAN access message from or associated with a UE.

B2. The network entity detects in the WLAN access message an indication of the UE status with a mobile network (e.g. a telecommunication network, a RAN or core network part). The indication of UE status may be those described with reference to FIGS. 2*a*-3*a* and 4-5*b*. For example, the indication may include the UE status regarding connectivity issues (e.g. limited service, no coverage) with the mobile network and/or include the UE status regarding a user preference for accessing the WLAN (or a WLAN) instead of the mobile network.

B3. If the network entity and/or WLAN is integrated with a RAN and/or telecommunication network, then the process proceeds to step B5. Otherwise the process proceeds to step B4.

B4. The network entity determines whether to allow the UE to access the WLAN based on the indication of the UE status with the mobile network. Proceed to B7.

B5. The network entity queries the mobile network (e.g. the RAN or core network part) as to whether the UE should be allowed access to the WLAN. The network entity may include the indication of the UE status for use by the mobile network in determining whether to allow the UE to access the WLAN. For example, the indication may include the UE status regarding connectivity issues (e.g. limited service, no coverage) with the mobile network and/or the UE status regarding a user preference for accessing the WLAN instead of the mobile network. Proceed to step B6.

B6. The network entity determines whether to allow the UE to access the WLAN based on the indication of UE status and/or on the mobile network's response to the query. Proceed to step B7.

B7. The network entity transmits a message to the UE allowing/rejecting the UE access attempt based on the decision. The signal flow may proceed to B1, for another UE access attempt or another access attempt by the UE (e.g. the UE status may have changed).

Figure 3C:
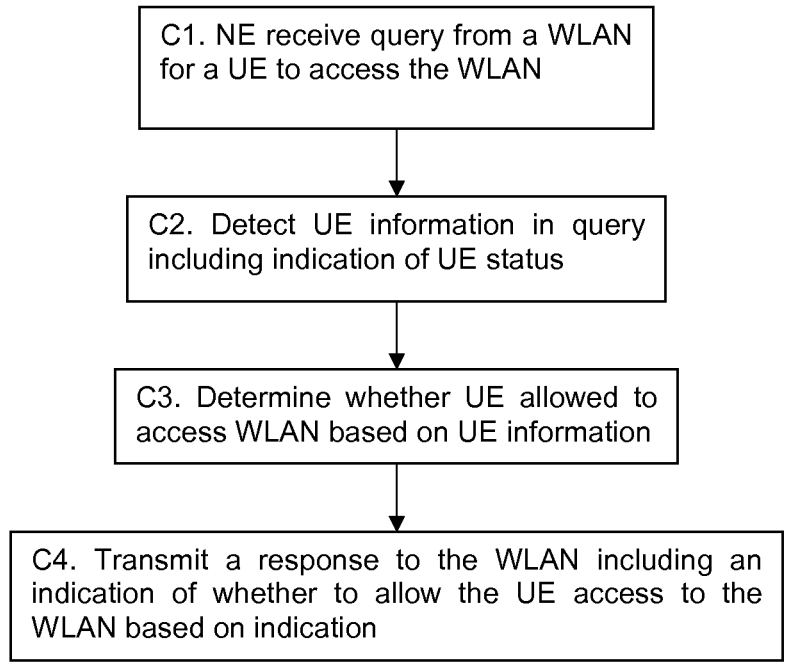
FIG. 3c is a flow diagram illustrating a further example process according to the invention.

FIG. 3*c* is a flow diagram illustrating an example process or further steps performed by a further network entity according to the invention. The steps of the process are as follows:

C1. Receiving from a WLAN a query message including information associated with a UE. The query may be from a network entity associated with the WLAN.

C2. Detecting an indication of the UE status with a telecommunication network within the query.

C3. Determining whether to allow the UE to access to the WLAN based on the query message. This may include determining whether to allow the UE to access to the WLAN based on the indication of UE status with the telecommunication network.

C4. Transmitting the determination of whether to allow the UE access to the WLAN to the WLAN. This may be transmitted to a network entity associated with the WLAN.

Figure 4:
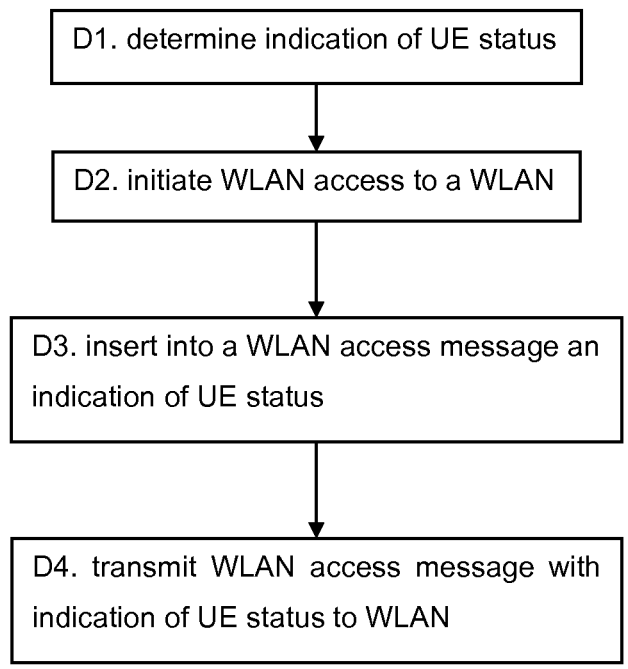
FIG. 4 is a flow diagram illustrating a further example process according to the invention performed by a UE.

FIG. 4 is a flow diagram illustrating a further example process according to the invention performed by a UE. The steps of the process are as follows:

D1. The UE determines the UE status with a telecommunications network (e.g. a mobile network). For example, the indication may include the UE status regarding connectivity issues (e.g. limited service, no coverage) with the telecommunications network and/or the UE status regarding a user preference for accessing the WLAN instead of the telecommunications network.

D2. The UE decides to initiate an access attempt with a WLAN.

D3. The UE inserts an indication of the UE status with the telecommunications network into a WLAN access message.

D4. The UE transmits the WLAN access message with the indication of UE status to the WLAN.

The UE may transmit further WLAN access messages or requests in response to response messages from the WLAN during the access attempt. Depending on the amount of information associated with the UE status with the telecommunications network, the UE may transmit further WLAN access messages including further UE status information. The UE status information may be in the form of one or more flags, fields, or part of a data payload for inclusion into a WLAN access message. The UE status information may be included in an existing parameter or an extension to an existing parameter of the WLAN access message. The UE may receive a response from the WLAN indicating whether the UE may access the WLAN, and if allowed, the UE proceeds to access the WLAN.

Figure 5A:
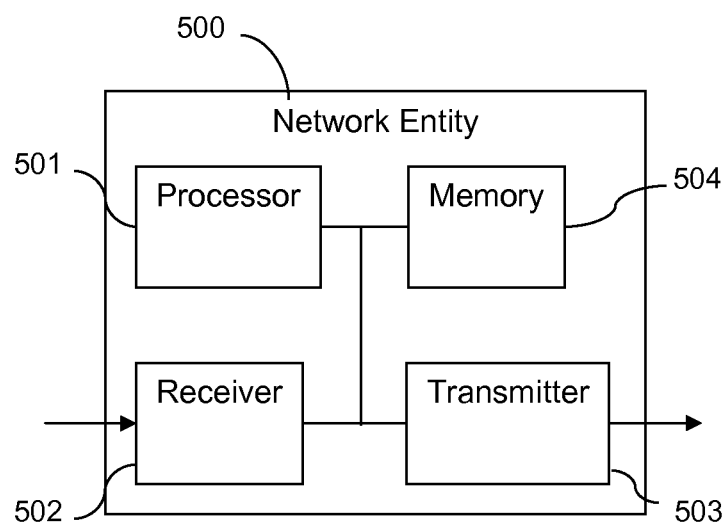
FIG. 5a is a schematic illustration of an example network entity according to the invention.

FIG. 5*a* is a schematic illustration of an example network entity 500 or apparatus according to the invention for use in a WLAN of a communications system. The communications system includes a telecommunications network and the WLAN. The telecommunications network including a RAN with a base station serving the UE and core network parts. The WLAN may include one or more wireless APs and/or ACs. The network entity 500 includes a processor 501, a receiver 502, a transmitter 503, and a memory 504, the processor 501 being coupled to the receiver 502, the transmitter 503 and the memory 504.

In operation, the receiver 502 is configured to receive a WLAN access message from a UE. The WLAN access message includes an indication of the UE status with a telecommunication network, (e.g. the UE status with the RAN and/or core network part of the telecommunication network and/or the UE status regarding a user preference for the UE to access the WLAN instead of the telecommunication network). The processor 501 is configured to determine from the indication whether to allow the UE 210 to access to the WLAN 204. The processor 501 may be further configured to detect the indication of UE status within the WLAN access message. This is because, the UE may include the indication of UE status in one or more WLAN access messages during an access attempt with the WLAN.

The WLAN access message may include any message, request or signal used during the UE initiation/connection procedure with the WLAN, e.g. during the UE's access attempt with the WLAN. For example, the WLAN message may include any one of the messages, requests or signals from the group of: a Probe Request message; a GAS initial request message; a authentication request message; an association request message; an authentication signal prior to an authentication decision associated with the UE accessing the WLAN; an upstream full authentication signal prior to an authentication decision associated with the UE accessing the WLAN; an upstream re-authentication signal prior to an authentication decision associated with the UE accessing the WLAN; an access signal from UE to WLAN prior to an authentication decision associated with the UE (210) accessing the WLAN; and/or any other message, request, or signal used by the UE to access the WLAN depending on the protocol(s) used (e.g. IEEE 801.11 standard, GAS etc).

The indication of UE status may include RAN accessibility information, 3GPP RAN accessibility information, data representative of the UE having full service, limited service or no coverage with the telecommunications network. The indication may include information associated with the UE status with the RAN, wherein the indication includes data representative of whether WLAN only access is active in the UE. The processor 501 may be configured to determine to allow the UE access to the WLAN when the indication of UE status indicates WLAN only access is active. The indication of UE status may further include data representative of whether RAN access with no coverage is active. The processor 501 may be further configured to determine to allow the UE access to the WLAN when the indication of UE status indicates RAN access with no coverage is active. In addition, the indication of UE status may include data representative of whether RAN access with limited service is active, and the processor may be further configured to determine to allow the UE access to the WLAN when the indication of UE status indicates RAN access with limited service is active. The indication of UE status may further include data representative of the user preference for the WLAN access attempt and the processor is further configured to determine whether WLAN access to the UE is given priority or not based on the user preference.

When there is WLAN integration into the telecommunication network (e.g. into the RAN or core network part), then the processor 501 is further configured to determine whether the associated WLAN access attempt should be allowed or not using the indication information in the WLAN access message by querying a network node in the telecommunication network (e.g. RAN or core network part) whether to allow the UE to access to the WLAN. The query may include the UE status received in the WLAN access message. The processor 501 is then further configured to receive the response from the network node and to further determine whether to allow the UE to access the WLAN based on the UE status and/or the response from the network node.

Figure 5B:
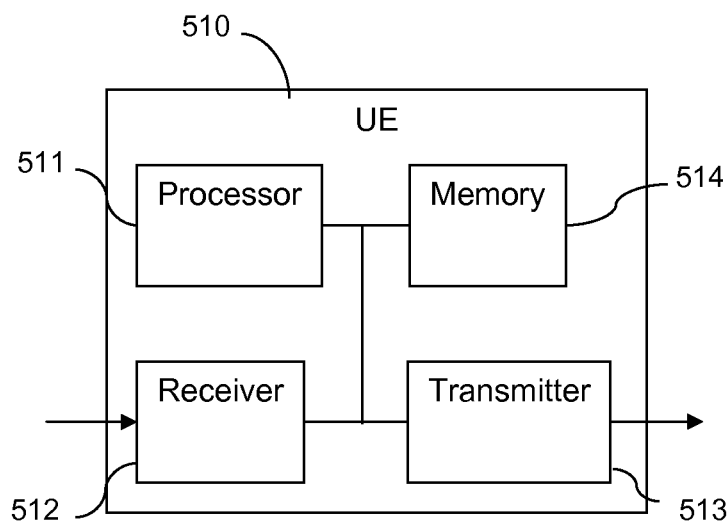
FIG. 5b is a schematic illustration of an example UE according to the invention.

FIG. 5*b* is a schematic illustration of an example UE 510 according to the invention. The UE 510 may be for use in a communications system, the communications system including a telecommunications network and a WLAN. The telecommunications network including a RAN and core network parts. The WLAN including one or more wireless APs, a network entity, and/or one or more wireless ACs. The UE 510 includes a processor 511, a receiver 512, a transmitter 513 and a memory 514, the processor 511 being coupled to the receiver 512, the transmitter 513 and the memory 514. The receiver 512 may be a dual mode receiver and/or include at least a cellular receiver for communicating with the telecommunications network and a wireless AP receiver (e.g. a transmitter based on the IEEE 802.11 standard) for communicating with the WLAN. The transmitter 513 may be a dual mode transmitter and/or include at least a cellular transmitter for communicating with a telecommunications network and a wireless AP transmitter (e.g. a transmitter based on the IEEE 802.11 standard) for communicating with a WLAN. In addition or alternatively, the receiver 512 and transmitter 513 may be in the form of one or more transceivers capable of communicating with the telecommunications network and the WLAN.

In operation, the processor is configured to determine the UE status with the telecommunications network (e.g. the RAN or core network parts). The processor is further configured to initiate WLAN access to the WLAN via the one or more wireless APs. The processor is configured to insert into a WLAN access message an indication of the UE status with the telecommunication network. The transmitter 513 is configured to transmit the WLAN access message to the WLAN for use in determining whether to allow the UE 510 to access the WLAN. The receiver is configured to receive a response from the WLAN and action the response accordingly. The UE status may be included in one or more WLAN access messages as described with reference to FIGS. 2*a*-5*a*.

The indication of UE status with the telecommunication network may be based on the UE status as described with reference to FIGS. 2*a*-5*a*. For example, the indication of UE status may include 3GPP RAN accessibility information, or the indication of UE status may include a portion of data from the group of: data representative of whether WLAN only access is active in the UE; data representative of whether RAN access with no coverage is active; data representative of whether RAN access with limited service is active; and data representative of the user preference for the WLAN access attempt.

Although the indication of UE status with the telecommunication network is included in a WLAN access message (or one or more WLAN access messages), it is to be appreciated that portions of the indication of UE status may be included in more than one WLAN access message, this depends on the size of the indication of UE status and whether this can be carried by one or more WLAN access messages. Although WLAN access messages are referred to, it is to be appreciated that any WLAN message or request from the UE defined in the IEEE 802.11 standard (e.g. user plane messages/requests and the like) or any other WLAN standard may be used to allow the UE to update the WLAN on the UE status with the telecommunications network (e.g. RAN accessibility information etc) at a later stage e.g. after association. The network entity may then be configured to detect the updated indication of UE status in the WLAN message and then determine whether to continue to allow the UE to access the WLAN or whether to inform the UE that it may connect to another WLAN or the telecommunications network.

Figure 5C:
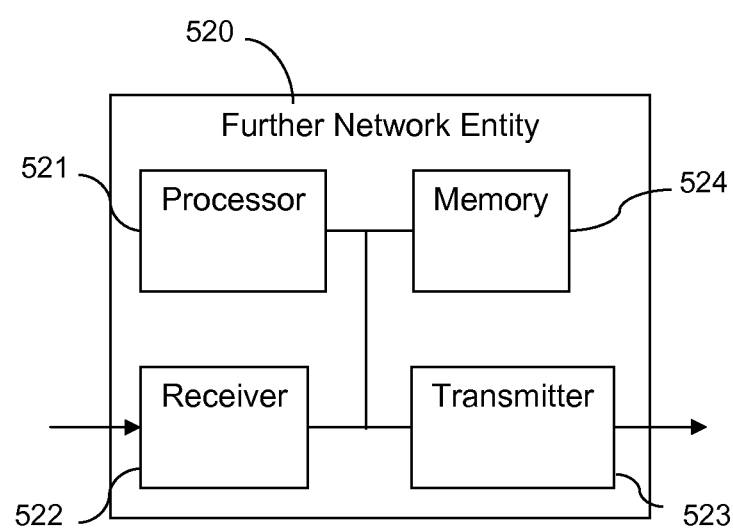
FIG. 5c is a schematic illustration of another example network entity according to the invention.

FIG. 5c is a schematic illustration of an example further network entity 520 or apparatus according to the invention for use in a telecommunication network. A communications system includes the telecommunications network and a WLAN. The telecommunications network including core network parts and a RAN with a base station serving a UE. The further network entity 520 includes a processor 521, a receiver 522, a transmitter 523, and a memory 524, the processor 521 being coupled to the receiver 522, the transmitter 523 and the memory 524.

In operation, the receiver 522 is configured to receive from a WLAN (e.g. from a network entity associated with the WLAN), a query message including information associated with the UE. The processor 521 is configured to determine whether to allow the UE to access to the WLAN based on the query message. This may involve the processor 521 being configured to detect an indication of UE status with the telecommunication network within the query, and the processor 521 determining whether to allow the UE to access to the WLAN based on the indication of UE status with the telecommunication network. The transmitter 523 is configured to transmit the determination of whether to allow the UE access to the WLAN (e.g. to a network entity associated with the WLAN).

The network entity 500, UE 510 and further network entity 520 as herein described can include memory units 504, 514, 524 and processors 501, 511 and 521 which can be used for storing and executing a computer program, comprising computer readable code which, when executed by the processors 501, 511 and 521, respectively, causes the network entity 500, UE 510 and further network entity 520 to perform the relevant methods, procedures, or processes of the invention as described herein. Such computer programs as described herein can be incorporated within one or more computer program products, each comprising a computer readable medium and one or more of the computer programs, where one or more of the computer programs are stored on the computer readable medium.

Although the invention has been described in terms of examples or preferred embodiments as set forth above, it should be understood that these examples or embodiments are illustrative only and that the claims are not limited to those examples or embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

The invention claimed is:

1. A method for operating a network entity in a communication system including a wireless local area network and a telecommunication network comprising a radio access network (RAN) and a core network part, the method comprising:
   receiving, via an access point of a wireless local-area network (WLAN), a WLAN access message from a user equipment (UE), the WLAN access message including an indication of the UE status with the telecommunication network; and
   determining from the indication whether to allow the UE access to the WLAN.

2. The method of claim 1, further comprising detecting the indication of UE status within the WLAN access message.

3. The method of claim 1, wherein the indication comprises information associated with the UE status with the RAN or core network part and the indication further includes RAN or core network accessibility information, respectively.

4. The method of claim 1, wherein the indication comprises information associated with the UE status with the RAN, wherein the indication includes data representative of whether WLAN only access is active in the UE, and wherein the step of determining includes allowing the UE access to the WLAN when the indication of UE status indicates WLAN only access is active.

5. The method of claim 1, wherein the indication of UE status includes data representative of whether RAN access with no coverage is active, and the step of determining includes allowing the UE access to the WLAN when the indication of UE status indicates RAN access with no coverage is active.

6. The method of claim 1, wherein the indication of UE status includes data representative of whether RAN access with limited service is active, and the step of determining includes allowing the UE access to the WLAN when the indication of UE status indicates RAN access with limited service is active.

7. The method of claim 1, wherein the indication of UE status further includes data representative of the user preference for the WLAN access attempt, and wherein the step of determining includes determining whether WLAN access to the UE is given priority or not based on the user preference.

8. The method of claim 1, wherein the radio access network is a 3GPP radio access network and the indication of the UE status includes 3GPP accessibility information.

9. The method of claim 1, wherein when there is WLAN integration into the telecommunication network, then the step of determining further includes querying a network node in the telecommunication network whether to allow the UE access to the WLAN and determining whether the associated WLAN access attempt should be allowed or not based on response from the network node.

10. The method of claim 1, wherein the WLAN access message includes any one of the messages or signals from the group of:
   a Probe Request message;
   a GAS initial request message;
   an authentication request message;
   an association request message;
   an authentication signal prior to an authentication decision associated with the UE accessing the WLAN;
   an upstream full authentication signal prior to an authentication decision associated with the UE accessing the WLAN;
   an upstream re-authentication signal prior to an authentication decision associated with the UE accessing the WLAN; and an access signal from UE to WLAN prior to an authentication decision associated with the UE accessing the WLAN.

11. The method of claim 10, wherein the authentication signals are based on EAP-SIM/AKA/AKA' authentication protocols.

12. The method of claim 10, wherein the indication of UE status with the telecommunication network is included as a parameter within the WLAN access message.

13. The method of claim 10, wherein the indication of UE status with the telecommunication network is included as an extension to an existing parameter within the WLAN access message.

14. The method of claim 1, wherein the WLAN is an IEEE 802.11 WLAN.

15. The method of claim 1, wherein the network entity is included in a WLAN access control node or a wireless access point of the WLAN.

16. A method for operating a user equipment (UE) in a communication system, the communication system comprising a wireless local area network (WLAN) and a telecommunication network including a radio access network (RAN) and a core network part, the method comprising:
determining the UE status with the telecommunication network;
initiating WLAN access to the WLAN;
inserting into a WLAN access message an indication of the UE status with the telecommunication network; and
transmitting the WLAN access message to a wireless access point in the WLAN for use in determining whether to allow the UE access to the WLAN.

17. The method of claim 16, wherein the indication of UE status with the telecommunication network includes at least a portion of data from the group of:
data representative of whether WLAN only access is active in the UE;
data representative of whether RAN access with no coverage is active;
data representative of whether RAN access with limited service is active;
data representative of the user preference for the WLAN access attempt; and
RAN or core network accessibility information.

18. The method of claim 16, wherein the radio access network is a 3GPP radio access network and the indication of the UE status includes 3GPP accessibility information.

19. The method of claim 16, wherein the WLAN access message includes any one of the messages or signals from the group of:
a Probe Request message;
a GAS initial request message;
an authentication request message;
an association request message;
an authentication signal prior to an authentication decision associated with the UE accessing the WLAN;
an upstream full authentication signal prior to an authentication decision associated with the UE accessing the WLAN;
an upstream re-authentication signal prior to an authentication decision associated with the UE accessing the WLAN; and
an access signal from UE to WLAN prior to an authentication decision associated with the UE accessing the WLAN.

20. The method of claim 19, wherein the authentication signals are based on EAP-SIM/AKA/AKA' authentication protocols.

21. The method of claim 19, wherein the indication of UE status with the telecommunication network is included as at least one of the following:
a parameter within the WLAN access message; and
an extension to an existing parameter within the WLAN access message.

22. The method of claim 16, wherein the WLAN is an IEEE 802.11 WLAN.

23. A network entity for use in a communication system comprising a wireless local area network (WLAN) and a telecommunication network comprising a radio access network (RAN) and a core network part, the network entity comprising a processor, receiver, transmitter, and memory, the processor being connected to the receiver, transmitter, and memory, wherein:
the receiver is configured to receive, via an access point of a WLAN, a WLAN access message from a user equipment (UE), the WLAN access message including an indication of the UE status with the telecommunication network; and
the processor is configured to determine from the indication whether to allow the UE access to the WLAN.

24. The network entity of claim 23, wherein the processor is further configured to detect the indication of UE status within the WLAN access message.

25. The network entity of claim 23, wherein the indication of UE status includes at least a portion of data from the group of:
data representative of whether WLAN only access is active in the UE;
data representative of whether RAN access with no coverage is active;
data representative of whether RAN access with limited service is active;
data representative of the user preference for the WLAN access attempt; and
RAN or core network accessibility information.

26. The network entity of claim 23, wherein when there is WLAN integration into the telecommunication network, then the processor is further configured to determine whether the associated WLAN access attempt should be allowed or not by querying a network node in the telecommunication network to determine whether to allow the UE access to the WLAN.

27. The network entity of claim 23, wherein the WLAN access message includes any one of the messages or signals from the group of:
a Probe Request message;
a GAS initial request message;
an authentication request message;
an association request message;
an authentication signal prior to an authentication decision associated with the UE accessing the WLAN;
an upstream full authentication signal prior to an authentication decision associated with the UE accessing the WLAN;
an upstream re-authentication signal prior to an authentication decision associated with the UE accessing the WLAN; and
an access signal from UE to WLAN prior to an authentication decision associated with the UE accessing the WLAN.

28. The network entity of claim 23, wherein the WLAN is an IEEE 802.11 WLAN.

29. A user equipment (UE) for use in a communication system, the communication system including a wireless local area network (WLAN) and a telecommunication network comprising a radio access network (RAN) and a core network part, the UE comprising a processor, receiver, transmitter, and memory, the processor being connected to the receiver, transmitter, and memory, wherein:

the processor is configured to:
 determine the UE status with the telecommunication network;
 initiate WLAN access to the WLAN; and
 insert into a WLAN access message an indication of the UE status with the telecommunication network; and
 the transmitter is configured to transmit the WLAN access message to a wireless access point in the WLAN for use in determining whether to allow the UE access to the WLAN.

30. The UE of claim 29, wherein the indication of UE status with the telecommunication network includes at least one of a portion of data from the group of:
 data representative of whether WLAN only access is active in the UE;
 data representative of whether RAN access with no coverage is active;
 data representative of whether RAN access with limited service is active;
 data representative of the user preference for the WLAN access attempt; and
 RAN or core network accessibility information.

31. The UE of claim 29, wherein the WLAN access message includes any one of the messages or signals from the group of:
 a Probe Request message;
 a GAS initial request message;
 an authentication request message;
 an association request message;
 an authentication signal prior to an authentication decision associated with the UE accessing the WLAN;
 an upstream full authentication signal prior to an authentication decision associated with the UE accessing the WLAN;
 an upstream re-authentication signal prior to an authentication decision associated with the UE accessing the WLAN; and
 an access signal from UE to WLAN prior to an authentication decision associated with the UE accessing the WLAN.

32. The UE of any of claim 29, wherein the RAN is a 3GPP RAN and the indication of the UE status includes 3GPP accessibility information.

33. The UE of claim 29, wherein the WLAN is an IEEE 802.11 WLAN.

34. A method for use in operating a network entity in a telecommunication network comprising a radio access network (RAN) and a core network part, the method comprising:
 receiving, from a network entity associated with a wireless local area network (WLAN), a query message including information associated with a user equipment (UE);
 determining whether to allow the UE access to the WLAN, based on the query message; and
 transmitting the determination of whether to allow the UE access to the WLAN to the network entity associated with the WLAN.

35. The method of claim 34, further comprising:
 detecting an indication of UE status with the telecommunication network within the query; and
 the step of determining further includes determining whether to allow the UE access to the WLAN based on the indication of UE status with the telecommunication network.

36. The method of claim 35, wherein the indication of UE status includes at least a portion of data from the group of:
 data representative of whether WLAN only access is active in the UE;
 data representative of whether RAN access with no coverage is active;
 data representative of whether RAN access with limited service is active;
 data representative of the user preference for the WLAN access attempt; and
 RAN or core network accessibility information.

37. A network entity for use in a telecommunication network comprising a radio access network (RAN) and a core network part, the network entity comprising a processor, receiver, transmitter, and memory, the processor being connected to the receiver, transmitter, and memory, wherein:
 the receiver is configured to receive, from a network entity associated with a wireless local area network (WLAN) a query message including information associated with a user equipment (UE);
 the processor is configured to determine whether to allow the UE access to the WLAN based on the query message; and
 the transmitter is configured to transmit the determination of whether to allow the UE access to the WLAN to the network entity associated with the WLAN.

38. The network entity of claim 37, wherein the processor is further configured to:
 detect an indication of UE status with the telecommunication network within the query; and
 determine whether to allow the UE access to the WLAN based on the indication of UE status with the telecommunication network.

39. The network entity of claim 38, wherein the indication of UE status includes at least a portion of data from the group of:
 data representative of whether WLAN only is active in the UE;
 data representative of whether RAN access with no coverage is active;
 data representative of whether RAN access with limited service is active;
 data representative of the user preference for the WLAN access attempt; and
 RAN or core network accessibility information.

* * * * *